(12) United States Patent
Shultz et al.

(10) Patent No.: US 8,880,868 B1
(45) Date of Patent: Nov. 4, 2014

(54) SECURE DETERMINISTIC FABRIC FOR SAFE AND SECURE PRODUCT DESIGN

(75) Inventors: Roger K. Shultz, Iowa City, IA (US); Joshua Bertram, Cedar Rapids, IA (US); Raymond Knoff, Vinton, IA (US); James Marek, Anamosa, IA (US); Max G. Taylor, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 13/524,329

(22) Filed: Jun. 15, 2012

(51) Int. Cl.
*H04L 29/06* (2006.01)

(52) U.S. Cl.
USPC .......................... 713/150; 713/151; 713/152

(58) Field of Classification Search
USPC ................................................ 713/150–152
See application file for complete search history.

(56) References Cited

U.S. PATENT DOCUMENTS

| | | | |
|---|---|---|---|
| 2002/0101866 A1* | 8/2002 | Miloslavsky et al. | 370/386 |
| 2004/0111605 A1* | 6/2004 | Weber | 713/152 |
| 2010/0115630 A1* | 5/2010 | Maire et al. | 726/30 |
| 2011/0066851 A1* | 3/2011 | Bello et al. | 713/166 |

\* cited by examiner

*Primary Examiner* — Kambiz Zand
*Assistant Examiner* — Abiy Getachew
(74) *Attorney, Agent, or Firm* — Donna P. Suchy; Daniel M. Barbieri

(57) ABSTRACT

A secure deterministic fabric includes switches that segregate data traffic requiring disparate levels of authentication or having different safety levels. Data may be segregated physically, utilizing different hardware; or virtually, by allocating certain assets such as memory blocks exclusively for certain levels of authentication. The secure deterministic fabric may include elements for safety monitoring and multi-level security monitoring.

20 Claims, 15 Drawing Sheets

SECURE DETERMINISTIC FABRIC FOR SAFE AND SECURE PRODUCT DESIGN

FIELD OF THE INVENTION

The present invention is directed generally toward computer systems having multiple levels of security, and more specifically toward segregating data traffic in a computer system.

BACKGROUND OF THE INVENTION

Systems using secure deterministic fabric (SDF) as an implementation approach gain size, weight and power advantages, increase performance and reduce communication latency. In addition, flexibility for growth in processing and I/O capability are provided by SDF solutions because each component is designed for use in both a safe and secure environment.

For example, a system may include an aviation application subsystem verified to meet certain safety requirements and a mission subsystem verified to meet mission requirements. The entire system may have one level of security termed "system high." However, when various classified communication data links are integrated into the avionics system, data at mixed levels of security such as "top secret," "secret" and "unclassified" must be managed for access by people with varying levels of security clearance.

Consequently, it would be advantageous if an apparatus existed that is suitable for virtually or physically separating data and data communications at different security levels and/or safety levels.

SUMMARY OF THE INVENTION

Accordingly, the present invention is directed to a novel method and apparatus for virtually or physically separating data and data communications at different security levels and/or safety levels.

One embodiment of the present invention is a system including a plurality of fabric switches, each of the plurality of fabric switches carrying data segregated according to a particular security level. The system may include a multi-level security processing element to verify security credentials and allow communication between fabric switches.

Another embodiment of the present invention is a system including a plurality of fabric switches, each of the plurality of fabric switches carrying data segregated according to a particular safety level. The system may include a safety processing element to perform cross checks on data according to the safety level of the data.

Another embodiment of the present invention is a system including a plurality of fabric switches, each of the plurality of fabric switches carrying data segregated according to a particular security level and safety level. The system may include a multi-level security and safety processing element to allow communication between fabric switches and perform cross checks on data according to the safety level of the data.

Each fabric switch may include encryption based separation to allow each fabric switch to carry multiple security levels or safety levels.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings.

The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
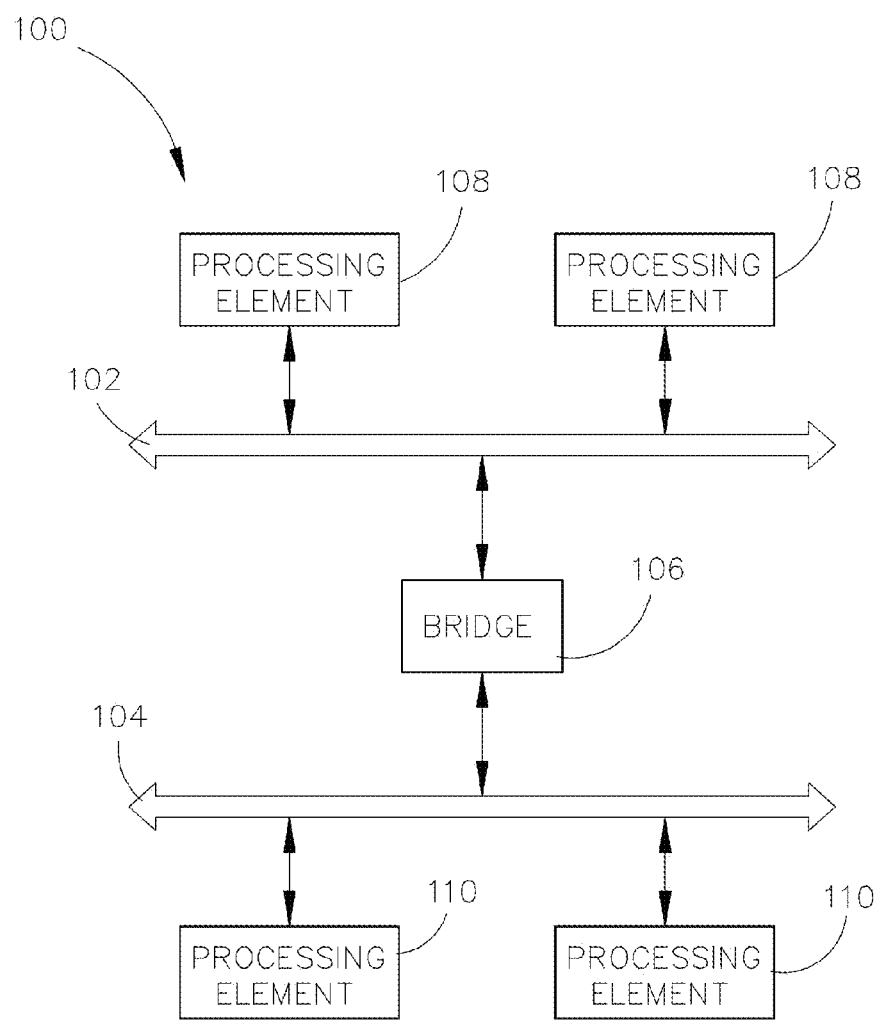
FIG. 1 shows a block diagram of a system for providing secure data communication.

Referring to FIG. 1, a block diagram of a system 100 for providing secure data communication is shown. The system 100 may include a first network 102 requiring a certain clearance level or security credentials, or adapted for a certain application; for example, the first network 102 may be adapted and certified for aviation applications. The system 100 may also include a second network 104 requiring a certain clearance level of security credentials; for example, where the first network 102 is adapted for aviation applications, the second network 104 may be a system high network adapted for mission applications. The first network 102 may transmit data between aviation application processing elements 108 and the second network 104 may transmit data between mission application processing elements 110. The system 100 may also include a network bridge 106 for transmitting traffic between the first network 102 and the second network 104, and consequently between aviation application processing elements 108 and mission application processing elements 110.

The system 100 of FIG. 1 may provide an adequate level of performance in an environment having only a single level of security. In an environment having more than one level of security, the architecture in FIG. 1 produces communication latency that may be unacceptable for many applications.

Security in a computer system and in a network environment in particular often includes multiple levels of security. For example, in a military environment, data may be "top secret," "secret," "classified" or "unclassified." Furthermore, within the security level "top secret," data may organized into compartments such as "TS-Korea," "TS-NATO" or "TS/SCI."

Figure 2:
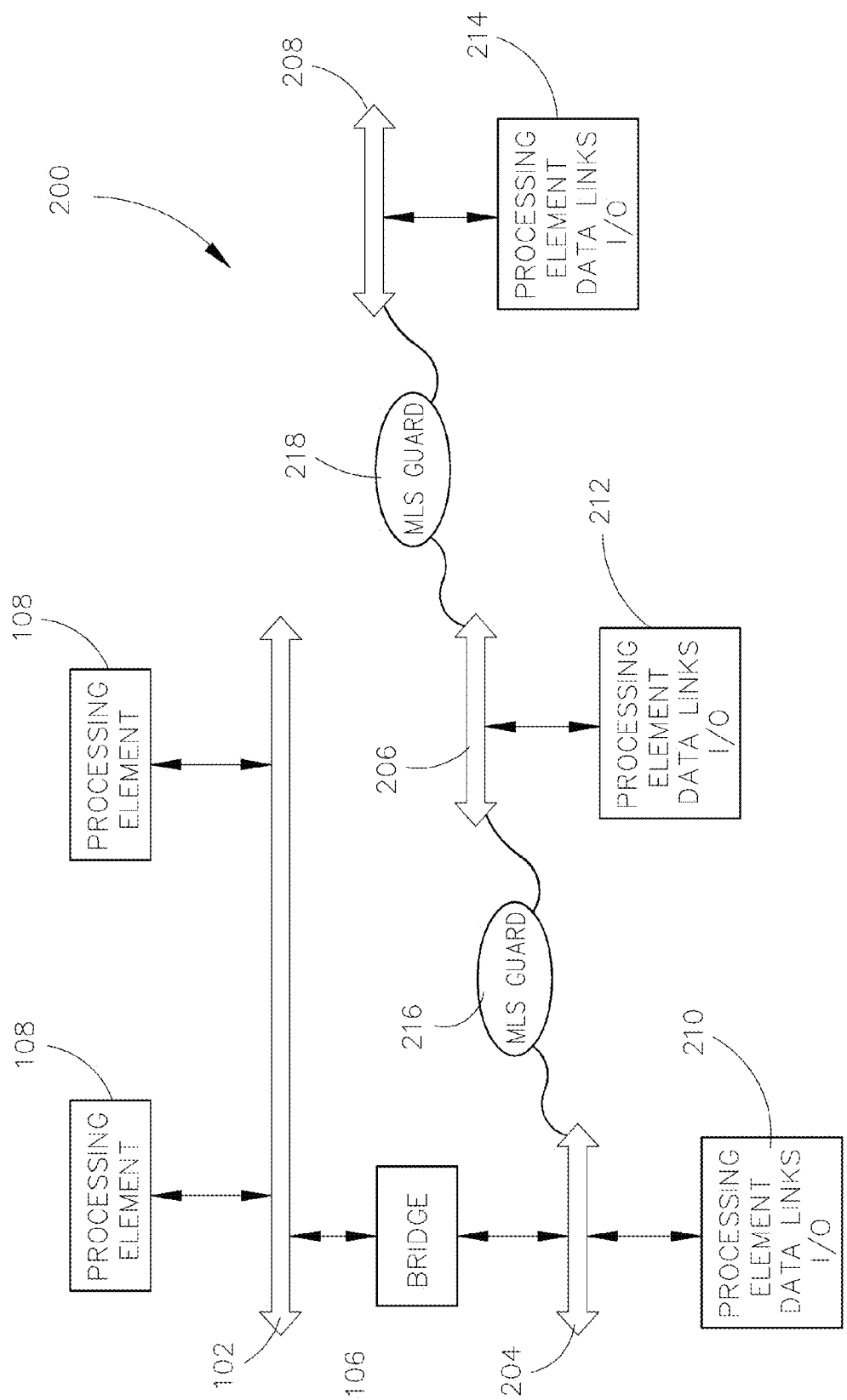
FIG. 2 shows a block diagram of a system for providing secure data communication in an environment having more than one level of security.

Referring to FIG. 2, a block diagram of a system 200 for providing secure data communication in an environment having more than one level of security is shown. As in the system of FIG. 1, the system 200 may include a first network 102 requiring a certain clearance level or security credentials, or adapted for a certain application such as an aviation application. The system 200 may also include one or more aviation application processing elements 108 connected to the first network 102 and a network bridge 106 connected to the first network 102 to facilitate data communication between the first network 102 and a second network 204, and one or more mission application processing elements 210.

Unlike the system in FIG. 1, the system 200 may also include a third network 206 connected to one or more third network processing elements 212. The third network 206, and the third network processing elements 212, may require a different or enhanced level of security as compared to the second network 204. The system 200 may also include a fourth network 208 connected to one or more fourth network processing elements 214. The fourth network 208, and the fourth network processing elements 212, may require a different or enhanced level of security as compared to either the second network 204 or the third network 206. Different levels of security between the second network 204, third network 206 and fourth network 208 may necessitate several multi-level security (MLS) guards 216, 218. The MLS guards 216, 218 may each be implemented as a processor having two Ethernet connections, a first Ethernet connection engaging a network having a first security requirement and a second Ethernet connection engaging a network having a second security requirement. For example, a first MLS guard 216 may be connected to the second network 204 and the third network 206; and a second MLS guard 218 may be connected to the third network 206 and the fourth network 208. MLS guards 216, 218 may monitor data traffic between networks and enforce security.

Continuing the aviation application example; the first network 102 may be an aviation application network, the second network 204 may be an unclassified network, the third network 206 may be a secret network and the fourth network 208 may be a top secret network. Where an aviation application processing element 108 requires data from a top secret processing element 214, a data request may be sent from the aviation application processing element 108, through the network bridge 106, to the unclassified first second network 204, then through the first MLS guard 216 to the secret third network 206, and finally through the second MLS guard 208 to the top secret fourth network 208. Each MLS guard must authenticate security credentials of the data traffic; each process of authentication adds latency and degrades performance. Furthermore, the same procedure may be replicated when data is returned from the top secret processing element 214 to the aviation application processing element 108. For some applications, such as the aviation application discussed herein, even a small amount of additional latency may be unacceptable.

A person skilled in the art may appreciate that even though the examples herein specifically discussed aviation applications and unclassified, secret and top secret networks, the principles set forth are applicable to any computer network implementation having more than one level of security authorization.

Figure 3:
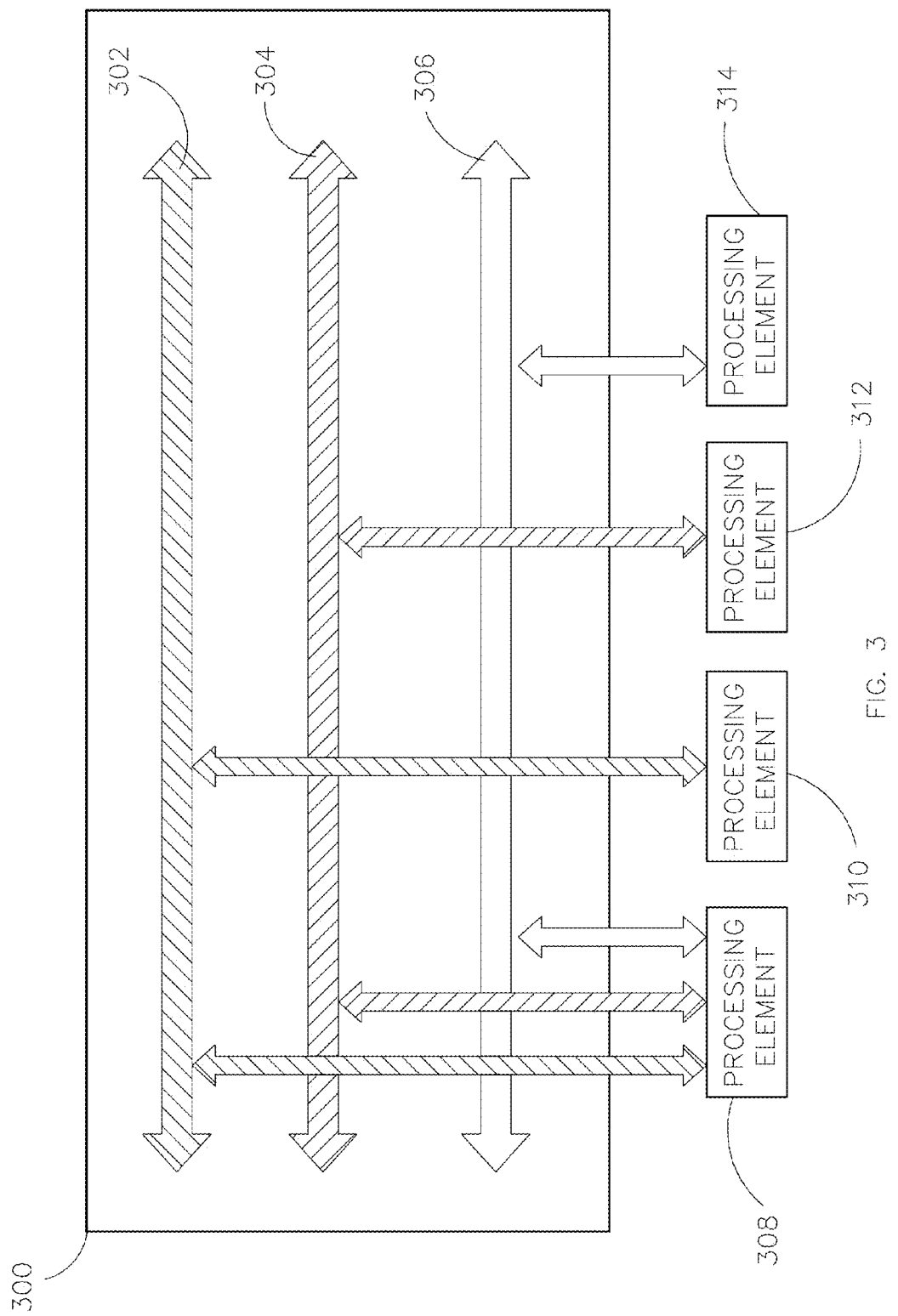
FIG. 3 shows a block diagram of a system having a secure deterministic fabric for providing secure data communication in an environment having three levels of security.

Referring to FIG. 3, a block diagram of a system having a secure deterministic fabric (SDF) 300 for providing secure data communication in an environment having three levels of security is shown. The SDF 300 may include a first fabric switch 302; the first fabric switch 302 configured to route data traffic requiring a specific first security level; for example, a top secret clearance. Dedicated processing elements 310 connected to the first fabric switch 302 may only communicate with the first fabric switch 302 and other processing elements connected to the first fabric switch 302. Any user attempting to access data on the first fabric switch 302 would have to possess the corresponding security level.

The SDF 300 may include a second fabric switch 304; the second fabric switch 304 configured to route data traffic requiring a second specific security level, different front the first specific security level; for example, a secret clearance. Dedicated processing elements 312 connected to the second fabric switch 304 may only communicate with the second fabric switch 304 and other processing elements connected to the second fabric switch 304. Any user attempting to access data on the second fabric switch 304 would have to possess the corresponding security level.

The SDF 300 may also include one or more multi-level processing elements 308. A multi-level processing element 308 may be connected to both the first fabric switch 302 and the second fabric switch 304. The multi-level processing element 308 may comprise a processing and memory, and the memory may be segregated such that certain defined memory blocks are designated for use by data from the first fabric switch 302 and other memory blocks are designated for use by data from the second fabric switch. A user having access to the multi-level processing element 308 may access both the first fabric switch 302 and the second fabric switch 304, but the user would still require appropriate security levels for both, and data would never mingle because memory block usage would require the corresponding security level.

Alternatively, the multi-level processing element may segregate data processing between the first fabric switch 302 and the second fabric switch 304 based on time; the multi-level processor may process data from the first fabric switch 302 for a certain duration of time, and not accept any processing instructions from the second fabric switch 304 during that duration. In this embodiment, data at different clearance levels is segregated in time.

The SDF 300 may include a third fabric switch 306; the third fabric switch 306 configured to route data traffic requiring a third specific security level, different front the first specific security level and the second specific security level; for example, an unclassified clearance. Dedicated processing elements 314 connected to the third fabric switch 306 may only communicate with the third fabric switch 306 and other processing elements connected to the third fabric switch 306. Any user attempting to access data on the third fabric switch 306 would have to possess the corresponding security level. Furthermore, the multi-level processing element 308 may define memory blocks designated for use by data from the third fabric switch. A user having access to the multi-level processing element 308 may access the first fabric switch 302, the second fabric switch 304 and the third fabric switch 306, but the user would still require appropriate security levels, and data would never mingle because memory block usage would require the corresponding security level.

Each of the first fabric switch 302, second fabric switch 304 and third fabric switch 306 may be implemented as a single PCIe switch. PCIe protocol includes characteristics for deterministic communication, such as: well bounded worst case time for set size data transfer; well defined jitter in communication time for all data transfer; cross check for data arrival; and cross check for data integrity. One skilled in the art may appreciate that technologies other than PCIe may be used to implement the present invention if such technologies provide equivalent characteristics for deterministic communication. In the context of the present application, the term fabric switch may be understood to include any interconnect technology capable of sending and receiving data. Fabric switches are not limited to serial interconnects or other non-Ethernet technology. Technologies that may be utilized by a fabric switch include PCIe, Ethernet, SAS, Fibre-Channel or any other suitable interconnect technology having suitable determinism, latency, redundancy, safety and security.

Systems using SDF may provide advantages in size, weight, power, performance, and communication latency as compared to the prior art.

Figure 4:
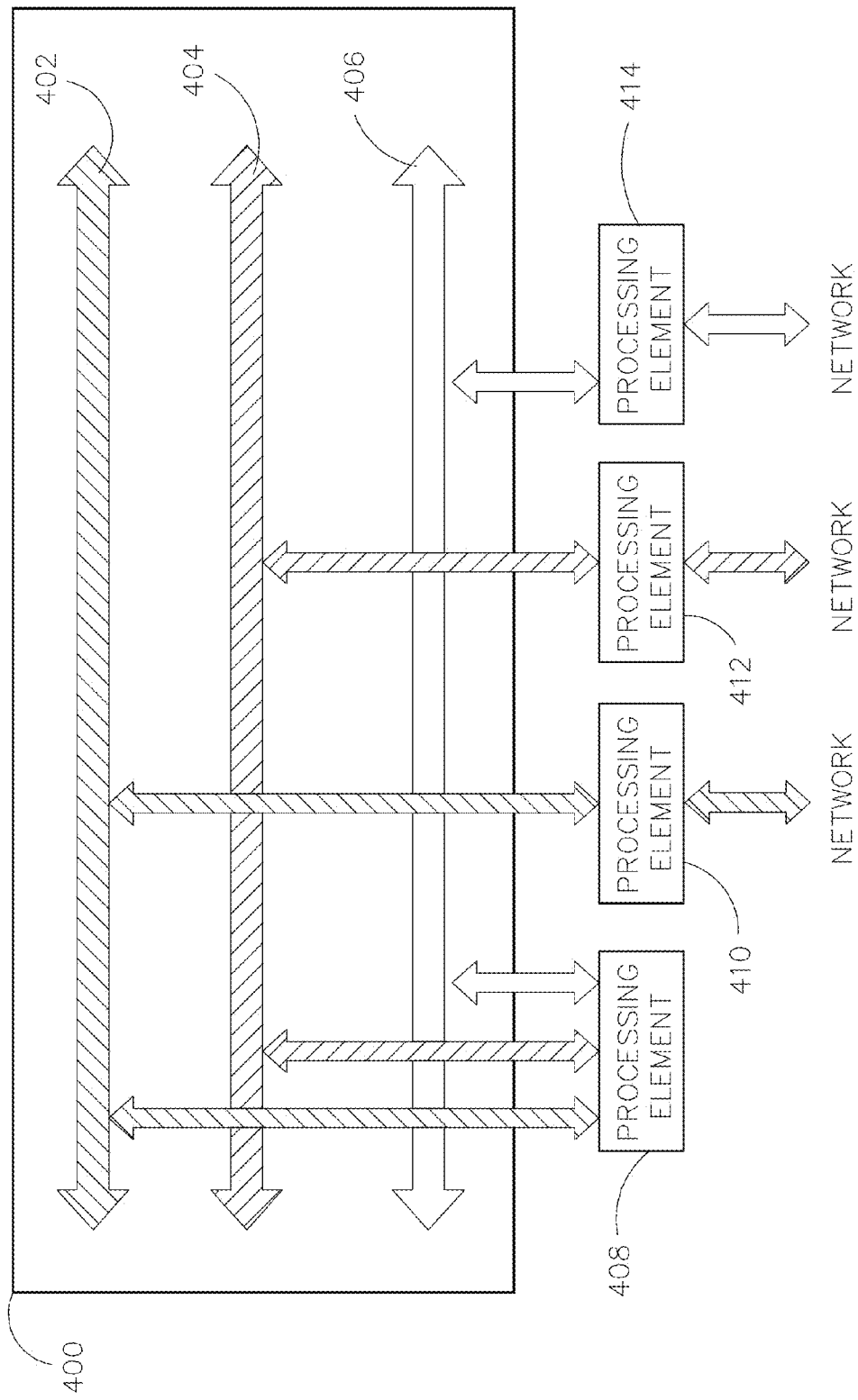
FIG. 4 shows a block diagram of a system having a secure deterministic fabric with multi-level security for providing secure data communication in an environment having three levels of security.

Referring to FIG. 4, a block diagram of a system having a secure deterministic fabric with multi-level security for providing secure data communication in an environment having three levels of security is shown. The SDF 400 may include a first fabric switch 402; the first fabric switch 402 configured to route data traffic requiring a specific first security level; for example, a top secret clearance. Dedicated processing elements 410 connected to the first fabric switch 402 may only communicate with the first fabric switch 402 and other processing elements connected to the first fabric switch 402. Any user attempting to access data on the first fabric switch 402 would have to possess the corresponding security level.

The SDF 400 may include a second fabric switch 404; the second fabric switch 404 configured to route data traffic requiring a second specific security level, different from the first specific security level; for example, a secret clearance. Dedicated processing elements 412 connected to the second fabric switch 404 may only communicate with the second fabric switch 404 and other processing elements connected to the second fabric switch 404. Any user attempting to access data on the second fabric switch 404 would have to possess the corresponding security level.

The SDF 400 may also include one or more MLS processing elements 408. A MLS processing element 408 may be connected to both the first fabric switch 402 and the second fabric switch 404. The MLS processing element 408 may function as an authenticating mechanism between the first fabric switch 402 and the second fabric switch 404. A user having access to the first fabric switch 402 through a dedicated processing element 410, or through some device connected to a network connected to the dedicated processing element 410, may attempt to access data or a process connected to the second fabric switch 404.

A user having access to the MLS processing element 408 may access both the first fabric switch 402 and the second fabric switch 404, but the user would still require appropriate security levels for both. Likewise, a user with appropriate security levels may access both the first fabric switch 402 and the second fabric switch 404 through a dedicated processing element 410, 412 connected to either because the MLS processing element 408 establishes a path for such access.

The SDF 400 may include a third fabric switch 406; the third fabric switch 406 configured to route data traffic requiring a third specific security level, different front the first specific security level and the second specific security level; for example, an unclassified clearance. Dedicated processing elements 414 connected to the third fabric switch 406 may only communicate with the third fabric switch 406 and other processing elements connected to the third fabric switch 406. Any user attempting to access data on the third fabric switch 406 would have to possess the corresponding security level. Furthermore, the MLS processing element 408 may function as an authenticating mechanism between the first fabric switch 402, the second fabric switch 404 and the third fabric switch 406. A user having access to the MLS processing element 408 may access the first fabric switch 402, the second fabric switch 404 and the third fabric switch 406, but the user would still require appropriate security levels. The MLS processing element 408 may be part of a trusted processing device specially adapted for authentication and data transfer between security level levels.

Each of the first fabric switch 402, second fabric switch 404 and third fabric switch 406 may be implemented as a single PCIe switch. PCIe protocol includes characteristics for deterministic communication, such as: well bounded worst case time for set size data transfer; well defined jitter in communication time for all data transfer; cross check for data arrival; and cross check for data integrity. One skilled in the art may appreciate that technologies other than PCIe may be used to implement the present invention if such technologies provide equivalent characteristics for deterministic communication.

Figure 5:
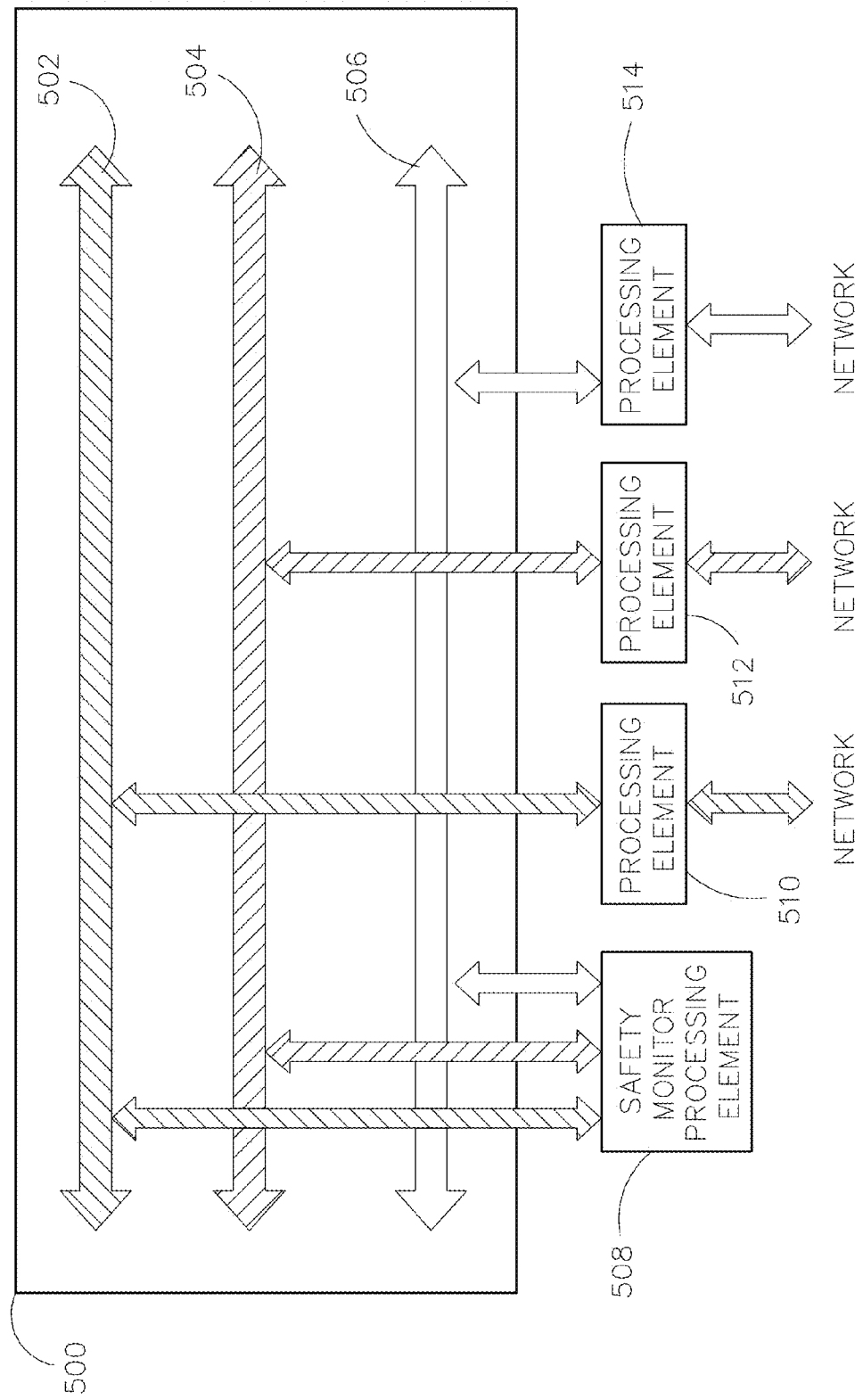
FIG. 5 shows a block diagram of a system having a secure deterministic fabric with safety monitoring for providing secure data communication in an environment having three levels of security.

Referring to FIG. 5, a block diagram of a system having a secure deterministic fabric with safety monitoring for providing secure data communication in an environment having three levels of security is shown. Safety in a computer system and in a network environment in particular often includes multiple levels of safety. For example, in avionics software, FAA standards define safety levels (Design Assurance Levels) from Level A (higher safety impact) to Level E (no safety impact). Data for software at Level A may require additional safety measures to ensure data integrity as compared to data for software at Level E.

The SDF 500 may include a first fabric switch 502; the first fabric switch 502 configured to route data traffic requiring a specific first security level; for example, a top secret clearance. Dedicated processing elements 510 connected to the first fabric switch 502 may only communicate with the first fabric switch 502 and other processing elements connected to the first fabric switch 502. Any user attempting to access data on the first fabric switch 502 would have to possess the corresponding security level.

The SDF 500 may include a second fabric switch 504; the second fabric switch 504 configured to route data traffic requiring a second specific security level, different front the first specific security level; for example, a secret clearance. Dedicated processing elements 512 connected to the second fabric switch 504 may only communicate with the second fabric switch 504 and other processing elements connected to the second fabric switch 504. Any user attempting to access data on the second fabric switch 304 would have to possess the corresponding security level.

The SDF 500 may include a third fabric switch 506; the third fabric switch 506 configured to route data traffic requiring a third specific security level, different front the first specific security level and the second specific security level; for example, an unclassified clearance. Dedicated processing elements 514 connected to the third fabric switch 506 may only communicate with the third fabric switch 506 and other processing elements connected to the third fabric switch 506. Any user attempting to access data on the third fabric switch 506 would have to possess the corresponding security level.

The SDF 500 may also include one or more safety monitor processing elements 508. A Safety monitor processing element 508 may be connected to one or more of the first fabric switch 502, the second fabric switch 504 and the third fabric switch 506. The Safety monitor processing element 508 may perform cross checks on data sent from one or more processing elements 510, 512, 514. Each of the one or more processing elements 510, 512, 514 may execute software necessitating different safety measures or different levels of data integrity assurance. For example, a first processing element 510 may be executing software at Design Assurance Level A, a second processing element 512 may be executing software at Design Assurance Level B and a third processing element 514 may be executing software at Design Assurance Level E. Alternatively, each processing element 510, 512, 514 may be executing processes at the same Design Assurance Level. The Safety monitor processing element 508 may perform cross checks across processing elements 510, 512, 514 performing the same function, or on a portion of data produced by each individual processing element 510, 512, 514. A single Safety monitor processing element 508 may operate on data and processing elements 510, 512, 514 connected to a single fabric switch 502, 504, 506 or across multiple fabric switches 502, 504, 506.

Each of the first fabric switch 502, second fabric switch 504 and third fabric switch 506 may be implemented as a single PCIe switch. PCIe protocol includes characteristics for deterministic communication, such as: well bounded worst case time for set size data transfer; well defined jitter in communication time for all data transfer; cross check for data arrival; and cross check for data integrity. One skilled in the art may appreciate that technologies other than PCIe may be used to implement the present invention if such technologies provide equivalent characteristics for deterministic communication.

Figure 6:
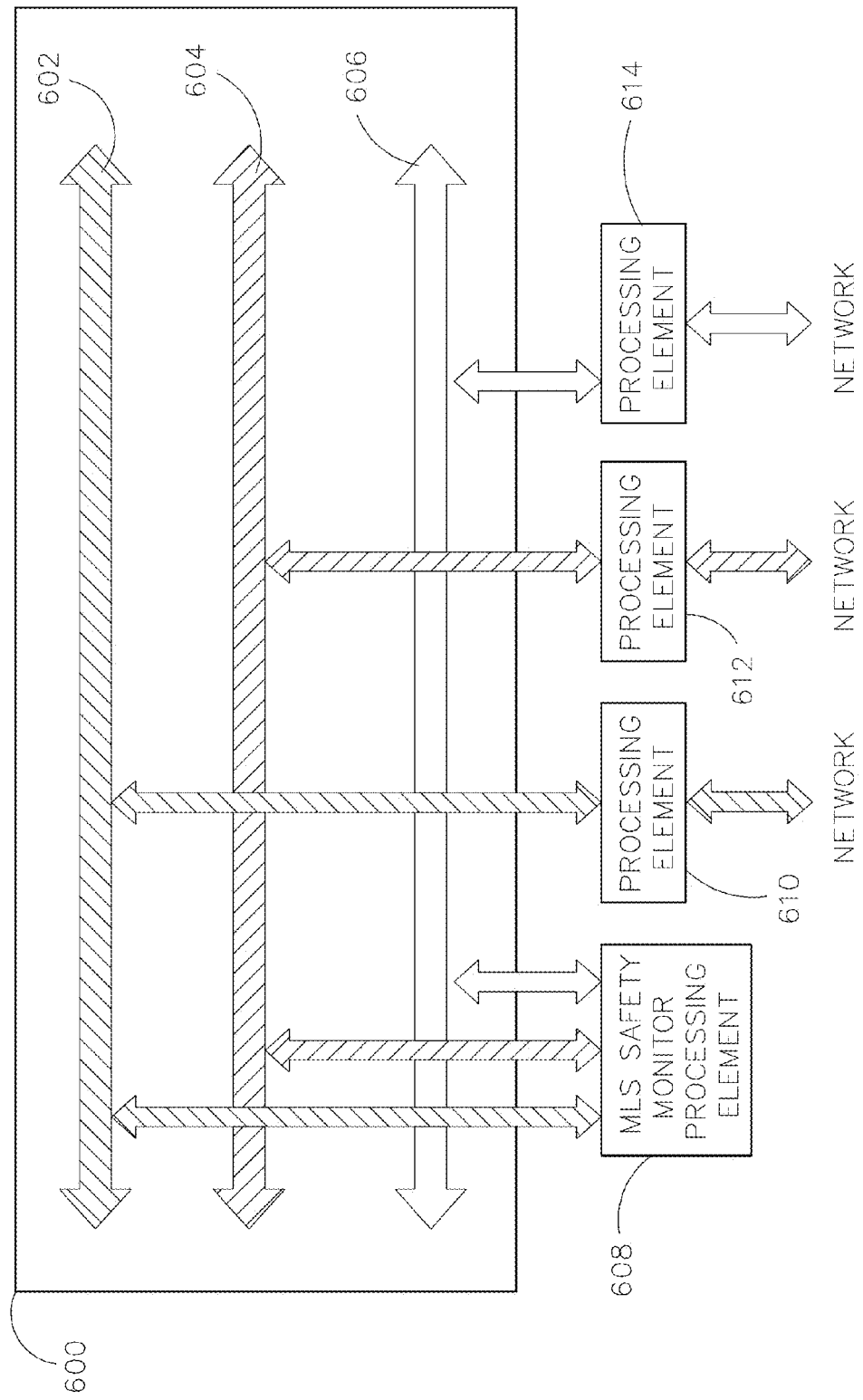
FIG. 6 shows a block diagram of a system having a secure deterministic fabric with multi-level security and safety monitoring for providing secure data communication in an environment having three levels of security.

Referring to FIG. 6, a block diagram of a system having a secure deterministic fabric with multi-level security and safety monitoring for providing secure data communication in an environment having three levels of security is shown. The SDF 600 may include a first fabric switch 602; the first fabric switch 602 configured to route data traffic requiring a specific first security level; for example, a top secret clearance. Furthermore, the first fabric switch 602 may be configured to route data traffic for processes at different safety levels. Dedicated processing elements 610 connected to the first fabric switch 602 may only communicate with the first fabric switch 602 and other processing elements connected to the first fabric switch 602. Any user attempting to access data on the first fabric switch 602 would have to possess the corresponding security level; also such data may conform to data integrity standards according to the relevant safety level.

The SDF 600 may include a second fabric switch 604; the second fabric switch 604 configured to route data traffic requiring a second specific security level, different front the first specific security level; for example, a secret clearance. Furthermore, the second fabric switch 604 may be configured to route data traffic for processes at different safety levels. Dedicated processing elements 612 connected to the second fabric switch 604 may only communicate with the second fabric switch 604 and other processing elements connected to the second fabric switch 604. Any user attempting to access data on the second fabric switch 304 would have to possess the corresponding security level; also such data may conform to data integrity standards according to the relevant safety level.

The SDF 600 may also include one or more MLS safety monitor processing elements 608. A MLS safety monitor processing element 608 may be connected to both the first fabric switch 602 and the second fabric switch 604. The MLS safety monitor processing element 608 may function as an authenticating mechanism between the first fabric switch 602 and the second fabric switch 604. A user having access to the first fabric switch 602 through a dedicated processing element 610, or through some device connected to a network connected to the dedicated processing element 610, may attempt to access data or a process connected to the second fabric switch 604. The MLS safety monitor processing element 608 may also perform cross checks as further set forth herein. The MLS safety monitor processing element 608 may process data according to a corresponding safety level regardless of security level of the fabric switch 602, 604, 606 transmitting such data.

The SDF 600 may include a third fabric switch 606; the third fabric switch 606 configured to route data traffic requiring a third specific security level, different front the first specific security level and the second specific security level; for example, an unclassified clearance. Furthermore, the third fabric switch 606 may be configured to route data traffic for processes at different safety levels. Dedicated processing elements 614 connected to the third fabric switch 606 may only communicate with the third fabric switch 606 and other processing elements connected to the third fabric switch 606. Any user attempting to access data on the third fabric switch 606 would have to possess the corresponding security level. The one or more MLS safety monitor processing elements 608 may function as authenticating mechanisms between the first fabric switch 602, the second fabric switch 604 and the third fabric switch 606. A user having access to the MLS safety monitor processing element 608 may access the first fabric switch 602, the second fabric switch 604 and the third fabric switch 606, but the user would still require appropriate security levels.

The MLS safety monitor processing elements 608 may also perform cross checks on data sent from one or more processing elements 610, 612, 614. The MLS safety monitor processing element 608 may perform cross checks across processing elements 610, 612, 614 performing the same function, or on a portion of data produced by each individual processing element 610, 612, 614. A single MLS safety monitor processing element 608 may operate on data and processing elements 610, 612, 614 connected to a single fabric switch 602, 604, 606 or across multiple fabric switches 602, 604, 606.

Each of the first fabric switch 602, second fabric switch 604 and third fabric switch 606 may be implemented as a single PCIe switch. PCIe protocol includes characteristics for deterministic communication, such as: well bounded worst case time for set size data transfer; well defined jitter in communication time for all data transfer; cross check for data arrival; and cross check for data integrity. One skilled in the art may appreciate that technologies other than PCIe may be used to implement the present invention if such technologies provide equivalent characteristics for deterministic communication.

Figure 7:
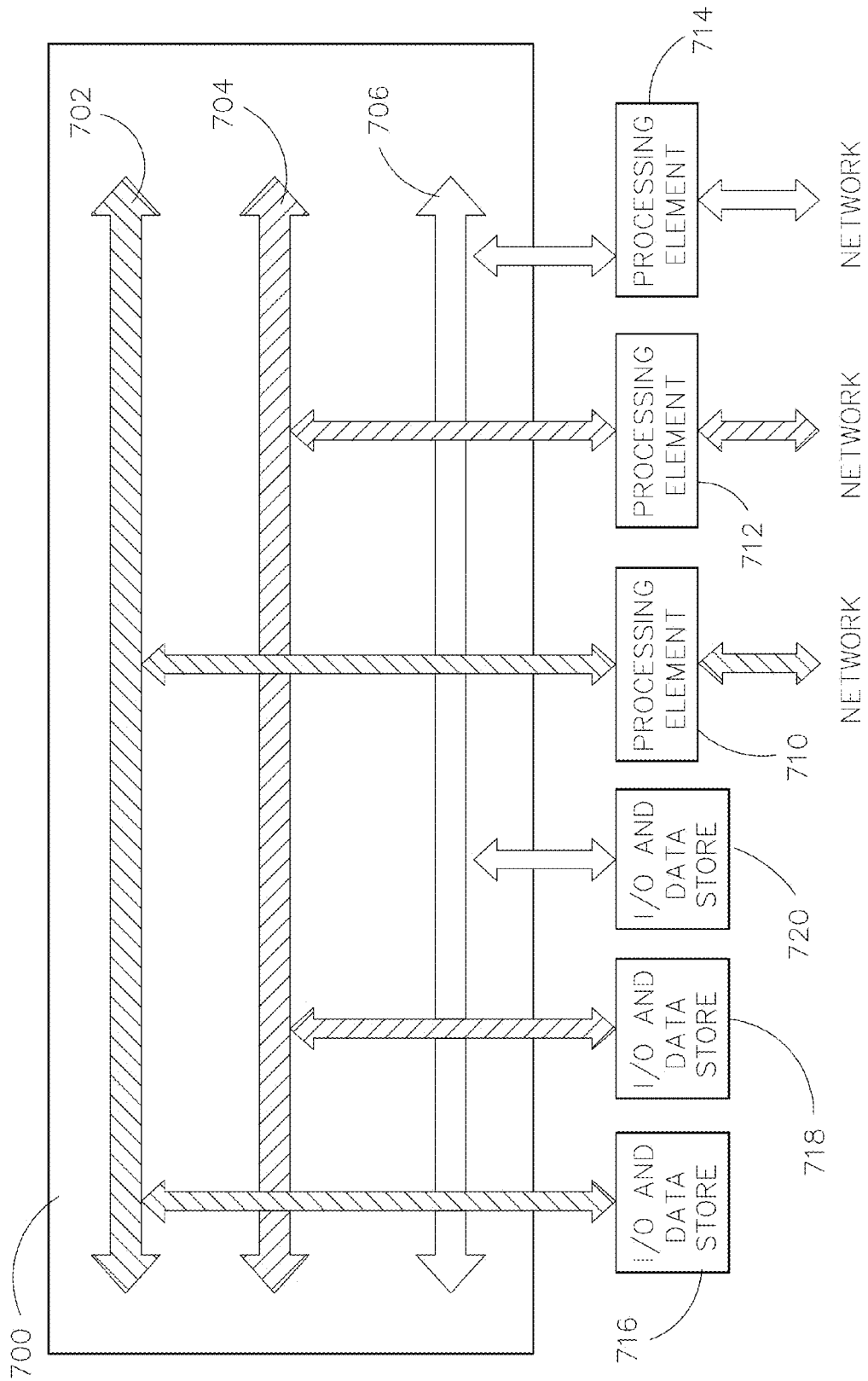
FIG. 7 shows a block diagram of a system having a secure deterministic fabric with segregated I/O and data stores for providing secure data communication in an environment having three levels of security.

Referring to FIG. 7, a block diagram of a system having a secure deterministic fabric with segregated I/O and data stores for providing secure data communication in an environment having three levels of security is shown. The SDF 700 may include a first fabric switch 702. Dedicated processing elements 710 connected to the first fabric switch 702 may only communicate with the first fabric switch 702 and other processing elements connected to the first fabric switch 702. Likewise, dedicated I/O and data stores 716 connected to the first fabric switch 702 may only communicate with the first fabric switch 702 and other processing elements connected to the first fabric switch 702.

The SDF 700 may include a second fabric switch 704; the second fabric switch 704 configured to route data traffic. Dedicated processing elements 712 connected to the second fabric switch 704 may only communicate with the second fabric switch 704 and other processing elements connected to the second fabric switch 704. Likewise, dedicated I/O and data stores 718 connected to the second fabric switch 704 may only communicate with the second fabric switch 704 and other processing elements connected to the second fabric switch 704.

The SDF 700 may include a third fabric switch 706; the third fabric switch 706 configured to route data traffic. Dedicated processing elements 714 connected to the third fabric switch 706 may only communicate with the third fabric switch 706 and other processing elements connected to the third fabric switch 706. Likewise, dedicated I/O and data stores 720 connected to the third fabric switch 706 may only communicate with the third fabric switch 706 and other processing elements connected to the third fabric switch 706.

Each of the first fabric switch 702, the second fabric switch 704 and the third fabric switch 706 may be switches from different manufacturers, or having different architecture. Switches from different manufactures may have different failure modes; therefore, incorporating switches from different manufacturers may reduce the likelihood of two or more switches failing under the same conditions and improve overall system reliability. For the same reason, each of the dedicated processing elements 710, 712, 714 may also be produced by a different manufacturer. Likewise, each I/O and data store 716, 718, 720 may be produced by a different manufacturer.

Each of the first fabric switch 702, second fabric switch 704 and third fabric switch 706 may be implemented as a single PCIe switch. PCIe protocol includes characteristics for deterministic communication, such as: well bounded worst case time for set size data transfer; well defined jitter in communication time for all data transfer; cross check for data arrival; and cross check for data integrity. One skilled in the art may appreciate that technologies other than PCIe may be used to implement the present invention if such technologies provide equivalent characteristics for deterministic communication.

Figure 8:
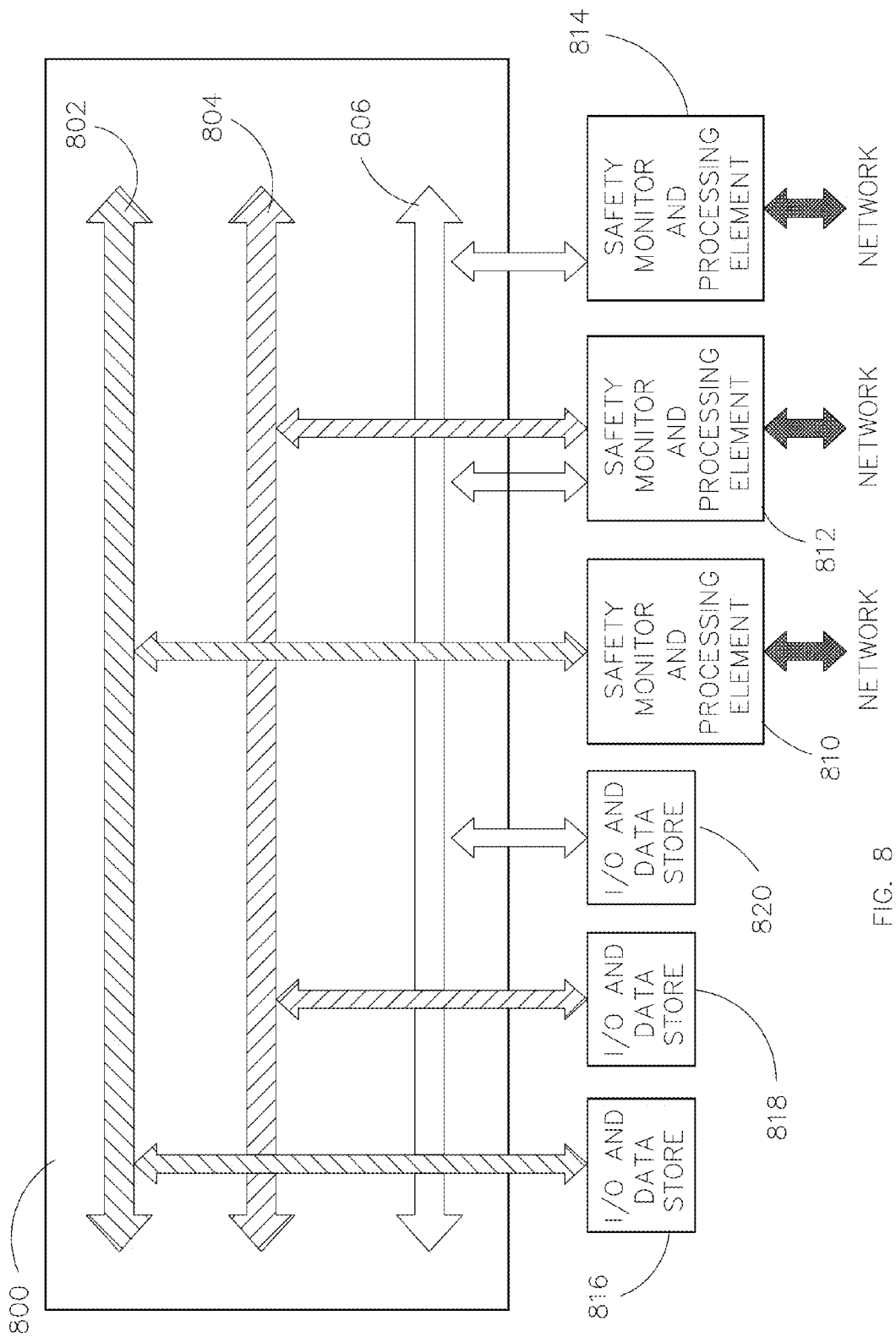
FIG. 8 shows a block diagram of a system having a secure deterministic fabric with segregated I/O and data stores, and safety monitoring for providing safe data communication.

Referring to FIG. 8, a block diagram of a system having a secure deterministic fabric with segregated I/O and data stores, and safety monitoring for providing safe data communication is shown. The SDF 800 may include a first fabric switch 802; the first fabric switch 802 configured to route data traffic. Furthermore, the first fabric switch 802 may be configured to route data traffic for processes at different safety levels. Dedicated I/O and data stores 816 connected to the first fabric switch 802 may communicate with the first fabric switch 802 and safety monitor and processing elements 810, 812, 814 connected to the first fabric switch 802. Any user attempting to access data on an I/O and data store 816 connected to the first fabric switch 802 may have to possess a corresponding security level.

The SDF 800 may include a second fabric switch 804; the second fabric switch 804 configured to route data traffic. Furthermore, the second fabric switch 804 may be configured to route data traffic for processes at different safety levels. Dedicated I/O and data stores 818 connected to the second fabric switch 804 may communicate with the second fabric switch 804 and safety monitor and processing elements 810, 812, 814 connected to the second fabric switch 804. Any user attempting to access data on an I/O and data store 818 connected to the second fabric switch 804 may have to possess a corresponding security level.

An SDF 800 according to the present invention may allow secondary processing sites to access I/O hardware when a primary site has a fault. For example, a first safety monitor and processing element 810 may allow access to one or more of the first fabric switch 802 and the second fabric switch 804 from a network; the first safety monitor and processing elements 810 may also perform cross checks to ensure data integrity. However, if the first safety monitor and processing elements 810 should fail, a second safety monitor and processing element 812 may perform comparable functions.

The SDF 800 may include a third fabric switch 806; the third fabric switch 806 configured to route data traffic. Furthermore, the third fabric switch 806 may be configured to route data traffic for processes at different safety levels. Dedicated I/O and data stores 820 connected to the third fabric switch 806 may only communicate with the third fabric switch 806 and safety monitor and processing elements 810, 812, 814 connected to the third fabric switch 806. Any user attempting to access data on an I/O and data store 820 connected to the third fabric switch 806 may have to possess a corresponding security level.

Multiple safety monitor and processing elements 810, 812, 814 provide higher system availability through the use of I/O from alternative sources when local I/O hardware faults. Each of the first fabric switch 802, the second fabric switch 804 and the third fabric switch 806 may be switches from different manufacturers, or having different architecture. Switches from different manufactures generally have different failure modes; therefore, incorporating switches from different manufacturers may reduce the likelihood of two or more switches failing under the same conditions and improve overall system reliability. For the same reason, each of the safety monitor processing elements 810, 812, 814 may also be produced by a different manufacturer. Likewise, each I/O and data store 816, 818, 820 may be produced by a different manufacturer. Various components may also be powered by separate, independent power supplies, further enhancing system availability.

Each of the first fabric switch 802, second fabric switch 804 and third fabric switch 806 may be implemented as a single PCIe switch. PCIe protocol includes characteristics for deterministic communication, such as: well bounded worst case time for set size data transfer; well defined jitter in communication time for all data transfer; cross check for data arrival; and cross check for data integrity. One skilled in the art may appreciate that technologies other than PCIe may be used to implement the present invention if such technologies provide equivalent characteristics for deterministic communication.

Figure 9:
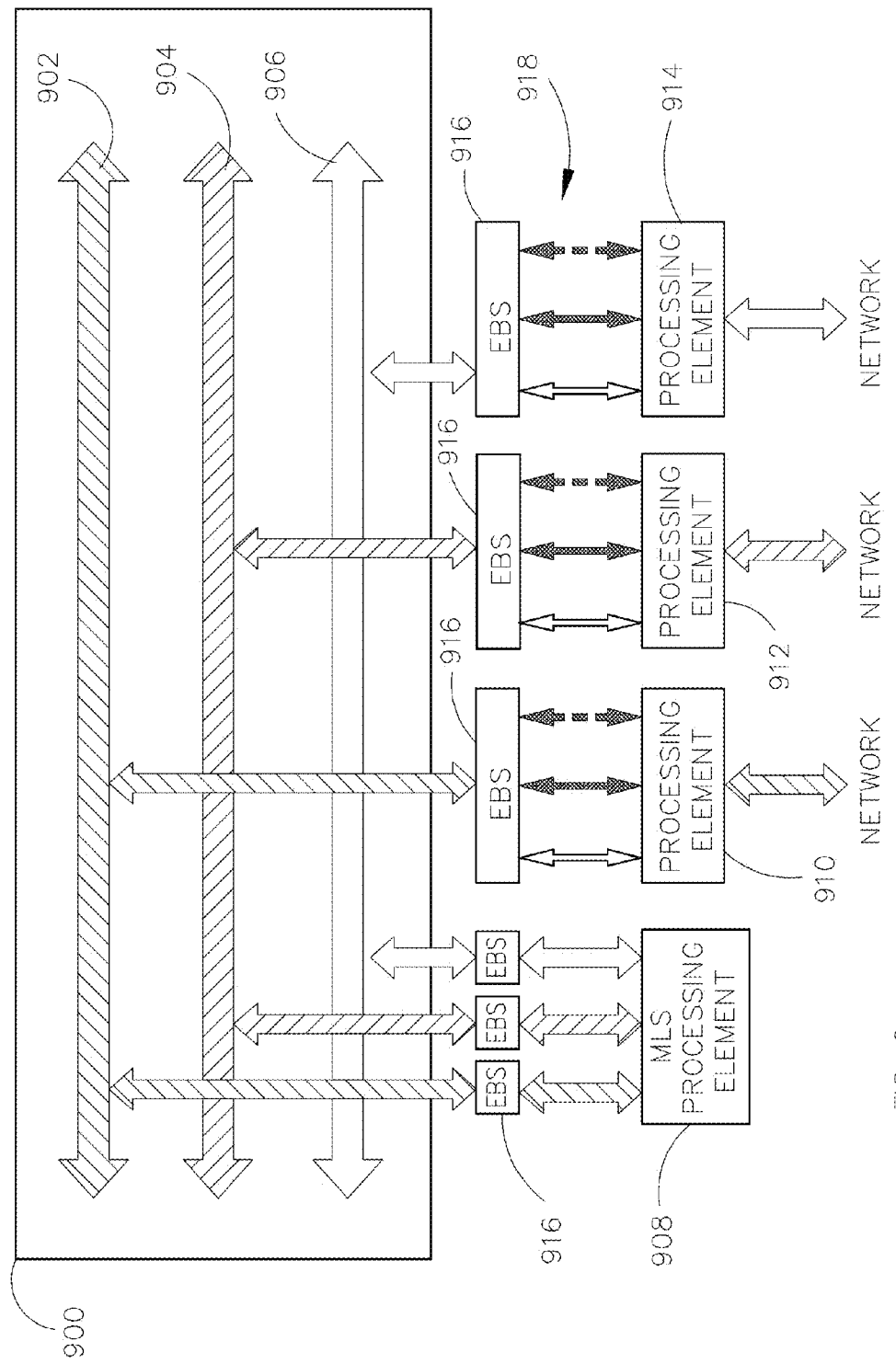
FIG. 9 shows a block diagram of a system having a secure deterministic fabric with multi-level security for providing secure data communication in an environment having three levels of security, and having encryption based segregation within each level of security.

Referring to FIG. 9, a block diagram of a system having a secure deterministic fabric with multi-level security for providing secure data communication in an environment having three levels of security, and having encryption based segregation within each level of security is shown. The SDF 900 may include a first fabric switch 902; the first fabric switch 902 configured to route data traffic requiring a specific first security level; for example, a top secret clearance. The first fabric switch 902 may be connected to an encryption based separation (EBS) element 916 that may further compartmentalize data traffic using multiple levels of encryption 918 within the first security level. Dedicated processing elements 910 connected to the EBS element 916 may only communicate with the first fabric switch 902 and other processing elements connected to the first fabric switch 902. Any user attempting to access data on the first fabric switch 902 would have to possess the corresponding security level to access the first fabric switch, and may need to possess encryption and decryption facilities as defined by the EBS element 916. The EBS element 916 may be a separate component of the dedicated processing element 910 or integrated into the dedicated processing element 910.

The SDF 900 may include a second fabric switch 904; the second fabric switch 904 configured to route data traffic requiring a second specific security level, different front the first specific security level; for example, a secret clearance. The second fabric switch 902 may be connected to an EBS element 916 that may further compartmentalize data traffic using multiple levels of encryption 918 within the second security level. Dedicated processing elements 912 connected to the EBS element 916 may only communicate with the second fabric switch 904 and other processing elements connected to the second fabric switch 904. Any user attempting to access data on the second fabric switch 904 would have to possess the corresponding security level, and may need to possess encryption and decryption facilities as defined by the EBS element 916. The EBS element 916 may be a separate component of the dedicated processing element 910 or integrated into the dedicated processing element 910.

The SDF 900 may also include one or more MLS processing elements 908. A MLS processing element 908 may be connected to both the first fabric switch 902 and the second fabric switch 904. The MLS processing element 908 may function as an authenticating mechanism between the first fabric switch 902 and the second fabric switch 904. A user having access to the first fabric switch 902 through a dedicated processing element 910 via an EBS element 916, or through some device connected to a network connected to the dedicated processing element 910, may attempt to access data or a process connected to the second fabric switch 904. Furthermore, the MLS processing element 908 may be connected to each of the first fabric switch 902 and the second fabric switch 904 through one or more EBS elements 916. Each of the one or more EBS elements 916 may encrypt data traffic within a particular security level.

A user having access to the MLS processing element 908 may access both the first fabric switch 902 and the second fabric switch 904, but the user would still require appropriate security levels for both, and may need to possess encryption and decryption facilities as defined by each EBS element 916. Likewise, a user with appropriate security levels may access both the first fabric switch 902 and the second fabric switch 904 through a dedicated processing element 910, 912 connected to either because the MLS processing element 908 establishes a path for such access.

The SDF 900 may include a third fabric switch 906; the third fabric switch 906 configured to route data traffic requiring a third specific security level, different from the first specific security level and the second specific security level; for example, an unclassified clearance. The third fabric switch 906 may be connected to an EBS element 916 that may further compartmentalize data traffic using multiple levels of encryption 918 within the third security level. Dedicated processing elements 914 connected to the EBS element 916 may only communicate with the third fabric switch 906 and other processing elements connected to the third fabric switch 906. Any user attempting to access data on the third fabric switch 906 would have to possess the corresponding security level, and may need to possess encryption and decryption facilities as defined by each EBS element 916. Furthermore, the MLS processing element 908 may function as an authenticating mechanism between the first fabric switch 902, the second fabric switch 904 and the third fabric switch 906. A user having access to the MLS processing element 908 may access the first fabric switch 902, the second fabric switch 904 and the third fabric switch 906, but the user would still require appropriate security levels. The MLS processing element 908 may be part of a trusted processing device specially adapted for authentication and data transfer between security level levels.

EBS elements 916 may be built from full encryption of all of the information within a virtual path or from any level of encryption based binding of a label denoting the level, sub-level, category, compartment, or caveat associated with the virtual channel. This could potentially include separation of classification levels (TS, S or S, U) on a single physical lane to increase the number of levels, sub-levels, categories, compartments, or caveats that a system could support or reducing the number of physical hardware paths required to support a certain number of levels, sub-levels, categories, compartments, or caveats. Processing Elements 910, 912, 914 could support these virtual paths with a Multiple Independent Layers of Security (MILS) processing architecture or depending on the assurance level required, an appropriately robust MLS Operating System commensurate with the type of separation.

Each of the first fabric switch 902, second fabric switch 904 and third fabric switch 906 may be implemented as a single PCIe switch. PCIe protocol includes characteristics for deterministic communication, such as: well bounded worst case time for set size data transfer; well defined jitter in communication time for all data transfer; cross check for data arrival; and cross check for data integrity. One skilled in the art may appreciate that technologies other than PCIe may be used to implement the present invention if such technologies provide equivalent characteristics for deterministic communication.

Figure 10:
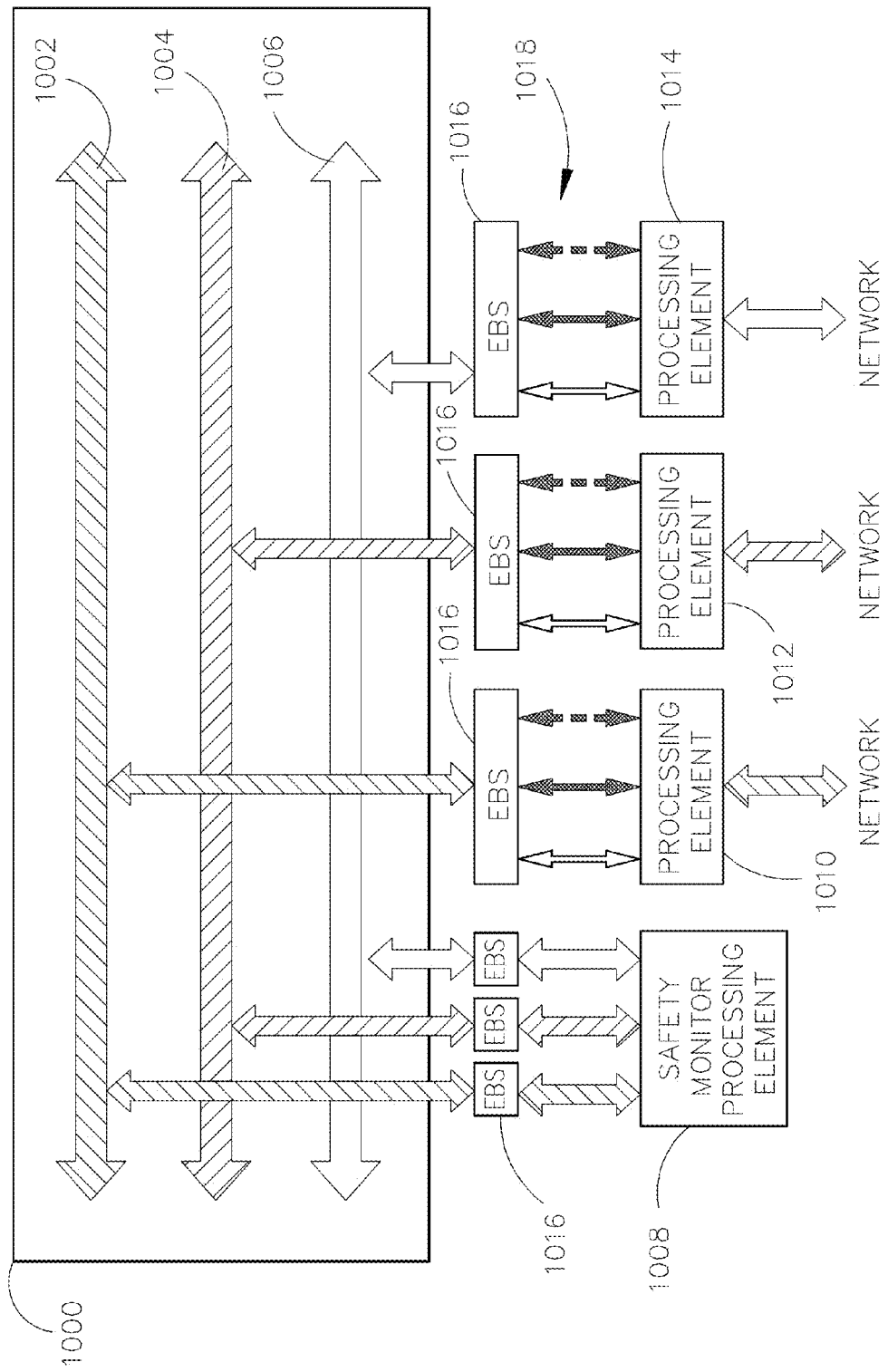
FIG. 10 shows a block diagram of a system having a secure deterministic fabric with safety monitoring for providing secure data communication in an environment having three levels of security, and having encryption based segregation within each level of security.

Referring to FIG. 10, a block diagram of a system having a secure deterministic fabric with safety monitoring for providing secure data communication in an environment having three levels of security, and having encryption based segregation within each level of security is shown. The SDF 1000 may include a first fabric switch 1002; the first fabric switch 1002 configured to route data traffic requiring a specific first security level; for example, a top secret clearance. The first fabric switch 1002 may be connected to an EBS element 1016 that may further compartmentalize data traffic using multiple levels of encryption 1018 within the first security level. Dedicated processing elements 1010 connected to the EBS element 1016 may only communicate with the first fabric switch 1002 and other processing elements connected to the first fabric switch 1002. Any user attempting to access data on the first fabric switch 1002 would have to possess the corresponding security level to access the first fabric switch, and may need to possess encryption and decryption facilities as defined by the EBS element 1016. The EBS element 1016 may be a separate component of the dedicated processing element 1010 or integrated into the dedicated processing element 1010.

The SDF 1000 may include a second fabric switch 1004; the second fabric switch 1004 configured to route data traffic requiring a second specific security level and/or a safety level, different front the first specific security level or safety level; for example, a secret clearance or Level A flight critical data. The second fabric switch 1002 may be connected to an EBS element 1016 that may further compartmentalize data traffic using multiple levels of encryption 1018 within the second security level and/or safety level. Dedicated processing elements 1012 connected to the EBS element 1016 may only communicate with the second fabric switch 1004 and other processing elements connected to the second fabric switch 1004. Any user attempting to access data on the second fabric switch 1004 would have to possess the corresponding security level, and may need to possess encryption and decryption facilities as defined by the EBS element 1016. The EBS element 1016 may be a separate component of the dedicated processing element 1010 or integrated into the dedicated processing element 1010.

The SDF 1000 may include a third fabric switch 1006; the third fabric switch 1006 configured to route data traffic requiring a third specific security level and/or safety level, different front the first specific security level or safety level, and the second specific security level or safety level; for example, an unclassified clearance or Level E flight data. The third fabric switch 1006 may be connected to an EBS element 1016 that may further compartmentalize data traffic using multiple levels of encryption 1018 within the third security level or safety level. Dedicated processing elements 1014 connected to the EBS element 1016 may only communicate with the third fabric switch 1006 and other processing elements connected to the third fabric switch 1006. Any user attempting to access data on the third fabric switch 1006 would have to possess the corresponding security level, and may need to possess encryption and decryption facilities as defined by each EBS element 1016.

The SDF 1000 may also include one or more safety monitor processing elements 1008. A Safety monitor processing element 1008 may be connected to one or more of the first fabric switch 1002, the second fabric switch 1004 and the third fabric switch 1006. The Safety monitor processing element 1008 may perform cross checks on data sent from one or more processing elements 1010, 1012, 1014; such data may conform to more than one safety level. The Safety monitor processing element 1008 may perform cross checks across processing elements 1010, 1012, 1014 performing the same function, or on a portion of data produced by each individual processing element 1010, 1012, 1014. A single Safety monitor processing element 1008 may operate on data and processing elements 1010, 1012, 1014 connected to a single fabric switch 1002, 1004, 1006 or across multiple fabric switches 1002, 1004, 1006. Furthermore, the safety monitor processing element 1008 may be connected to each of the first fabric switch 1002, the second fabric switch 1004 and the third fabric switch 1006 through one or more EBS elements 1016. Each of the one or more EBS elements 1016 may encrypt data traffic originating from a particular fabric switch.

EBS elements 1016 may be built from full encryption of all of the information within a virtual path or from any level of encryption based binding of a label denoting the level, sub-level, category, compartment, or caveat associated with the virtual channel. This could potentially include separation of classification levels (TS, S or S, U) on a single physical lane to increase the number of levels, sub-levels, categories, compartments, or caveats that a system could support or reducing the number of physical hardware paths required to support a certain number of levels, sub-levels, categories, compartments, or caveats. Processing Elements 1010, 1012, 1014 could support these virtual paths with a Multiple Independent Layers of Security (MILS) processing architecture or depending on the assurance level required, an appropriately robust MLS Operating System commensurate with the type of separation.

Each of the first fabric switch 1002, second fabric switch 1004 and third fabric switch 1006 may be implemented as a single PCIe switch. PCIe protocol includes characteristics for deterministic communication, such as: well bounded worst case time for set size data transfer; well defined jitter in communication time for all data transfer; cross check for data arrival; and cross check for data integrity. One skilled in the art may appreciate that technologies other than PCIe may be used to implement the present invention if such technologies provide equivalent characteristics for deterministic communication.

Figure 11:
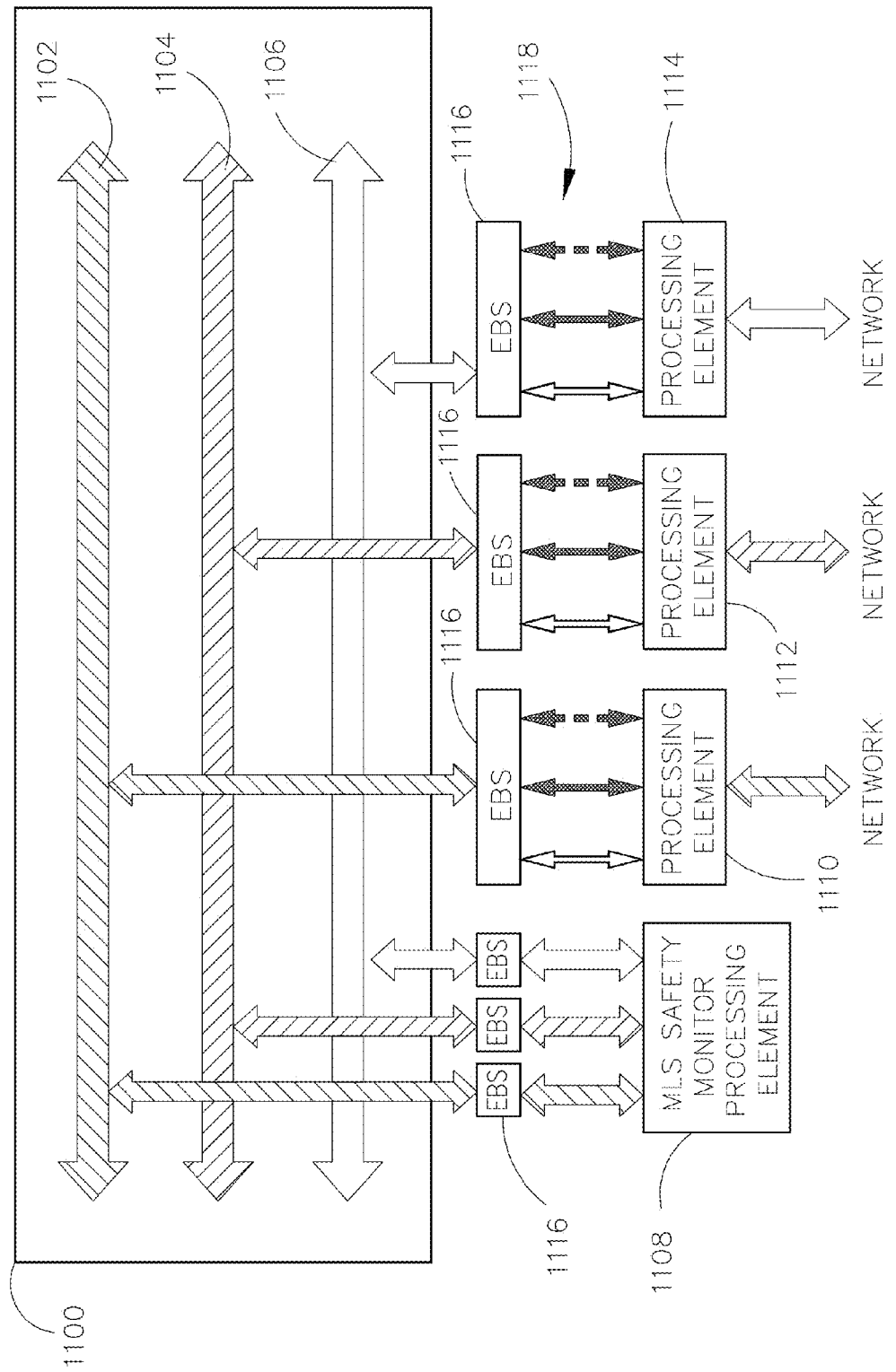
FIG. 11 shows a block diagram of a system having a secure deterministic fabric with multi-level security and safety monitoring for providing secure data communication in an environment having three levels of security, and having encryption based segregation within each level of security.

Referring to FIG. 11, a block diagram of a system having a secure deterministic fabric with multi-level security and safety monitoring for providing secure data communication in an environment having three levels of security, and having encryption based segregation within each level of security is shown. The SDF 1100 may include a first fabric switch 1102; the first fabric switch 1102 configured to route data traffic requiring a specific first security level and/or a safety level; for example, a top secret clearance or Level A flight critical data. The first fabric switch 1102 may be connected to an EBS element 1116 that may further compartmentalize data traffic using multiple levels of encryption 1118 within the first security level or safety level. Dedicated processing elements 1110 connected to the EBS element 1116 may only communicate with the first fabric switch 1102 and other processing elements connected to the first fabric switch 1102. Any user attempting to access data on the first fabric switch 1102 would have to possess the corresponding security level.

The SDF 1100 may include a second fabric switch 1104; the second fabric switch 1104 configured to route data traffic requiring a second specific security level and/or safety level, different front the first specific security level or safety level; for example, a secret clearance or Level B flight data. The second fabric switch 1104 may be connected to an EBS element 1116 that may further compartmentalize data traffic using multiple levels of encryption 1118 within the second security level or safety level. Dedicated processing elements 1112 connected to the EBS element 1116 may only communicate with the second fabric switch 1104 and other processing elements connected to the second fabric switch 1104. Any user attempting to access data on the second fabric switch 304 would have to possess the corresponding security level.

The SDF 1100 may also include one or more MLS safety monitor processing elements 1108. A MLS safety monitor processing element 1108 may be connected to both the first fabric switch 1102 and the second fabric switch 1104. The MLS safety monitor processing element 1108 may function as an authenticating mechanism between the first fabric switch 1102 and the second fabric switch 1104. A user having access to the first fabric switch 1102 through a dedicated processing element 1110, or through some device connected to a network connected to the dedicated processing element 1110, may attempt to access data or a process connected to the second fabric switch 1104. The MLS safety monitor processing element 1108 may also perform cross checks as further set forth herein. Furthermore, the MLS safety monitor processing element 1108 may be connected to each of the first fabric switch 1102 and the second fabric switch 1104 through one or more EBS elements 1116. Each of the one or more EBS elements 1116 may encrypt data traffic originating from a particular fabric switch.

The SDF 1100 may include a third fabric switch 1106; the third fabric switch 1106 configured to route data traffic requiring a third specific security level and/or safety level, different front the first specific security level or safety level, and the second specific security level or safety level; for example, an unclassified clearance or Level E flight data. The third fabric switch 1106 may be connected to an EBS element 1116 that may further compartmentalize data traffic using multiple levels of encryption 1118 within the third security level or safety level. Dedicated processing elements 1114 connected to the third fabric switch 1106 may only communicate with the third fabric switch 1106 and other processing elements connected to the third fabric switch 1106. Any user attempting to access data on the third fabric switch 1106 would have to possess the corresponding security level. The one or more MLS safety monitor processing elements 1108 may function as authenticating mechanisms between the first fabric switch 1102, the second fabric switch 1104 and the third fabric switch 1106. A user having access to the MLS safety monitor processing element 1108 may access the first fabric switch 1102, the second fabric switch 1104 and the third fabric switch 1106, but the user would still require appropriate security levels.

The MLS safety monitor processing elements 1108 may also perform cross checks on data sent from one or more processing elements 1110, 1112, 1114. The MLS safety monitor processing element 1108 may perform cross checks across processing elements 1110, 1112, 1114 performing the same function, or on a portion of data produced by each individual processing element 1110, 1112, 1114. A single MLS safety monitor processing element 1108 may operate on data and processing elements 1110, 1112, 1114 connected to a single fabric switch 1102, 1104, 1106 or across multiple fabric switches 1102, 1104, 1106.

EBS elements 1116 may be built from full encryption of all of the information within a virtual path or from any level of encryption based binding of a label denoting the level, sub-level, category, compartment, or caveat associated with the virtual channel. This could potentially include separation of classification levels (TS, S or S, U) on a single physical lane to increase the number of levels, sub-levels, categories, compartments, or caveats that a system could support or reducing the number of physical hardware paths required to support a certain number of levels, sub-levels, categories, compartments, or caveats. Processing Elements 1110, 1112, 1114 could support these virtual paths with a Multiple Independent Layers of Security (MILS) processing architecture or depending on the assurance level required, an appropriately robust MLS Operating System commensurate with the type of separation.

Each of the first fabric switch 1102, second fabric switch 1104 and third fabric switch 1106 may be implemented as a single PCIe switch. PCIe protocol includes characteristics for deterministic communication, such as: well bounded worst case time for set size data transfer; well defined jitter in communication time for all data transfer; cross check for data arrival; and cross check for data integrity. One skilled in the art may appreciate that technologies other than PCIe may be used to implement the present invention if such technologies provide equivalent characteristics for deterministic communication.

Figure 12:
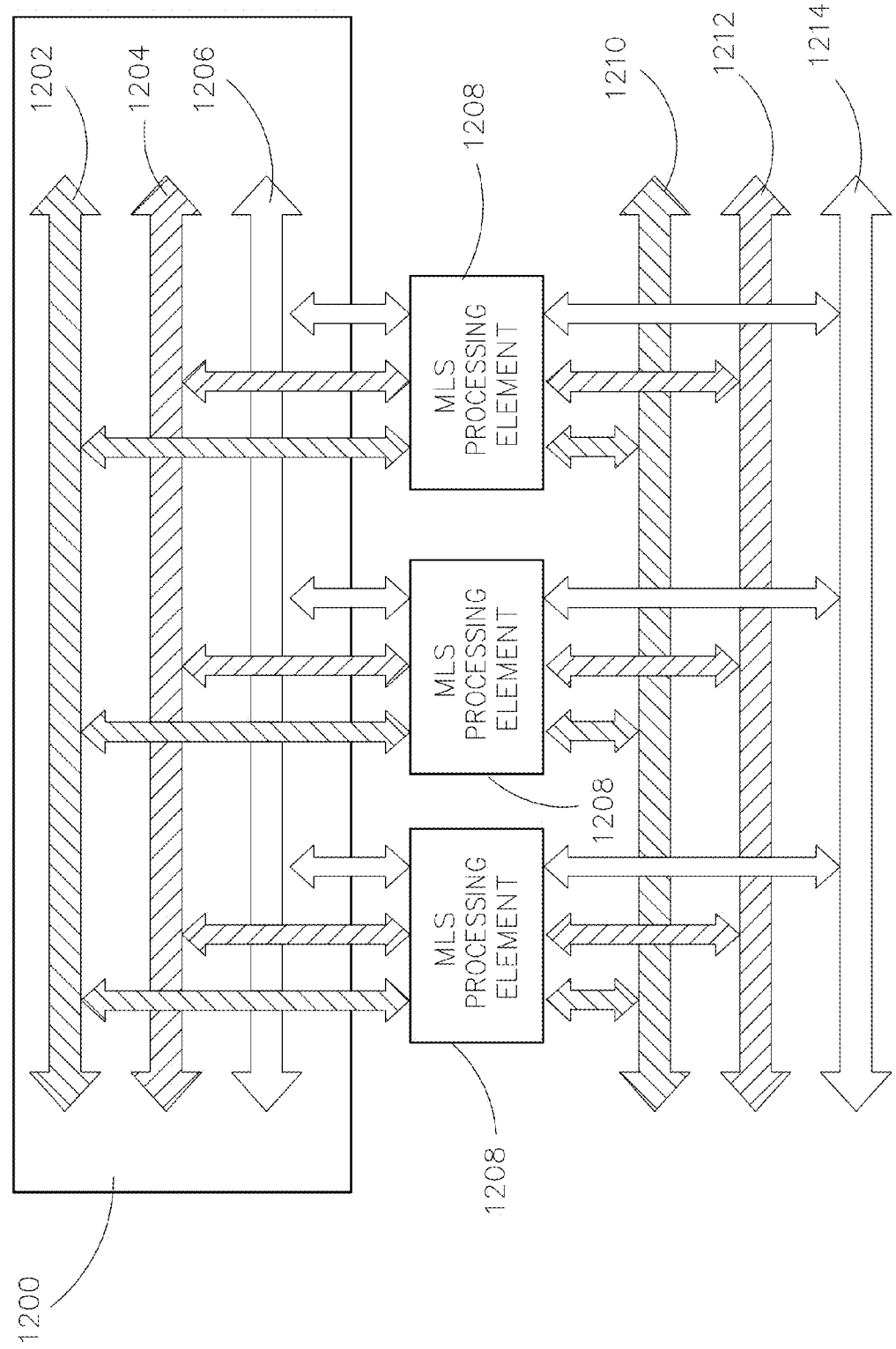
FIG. 12 shows a block diagram of a system having a secure deterministic fabric with several multi-level security elements for providing redundant connections between the secure deterministic fabric and several segregated networks.

Referring to FIG. 12, a block diagram of a system having a secure deterministic fabric with several multi-level security elements for providing redundant connections between the secure deterministic fabric and several segregated networks is shown. The SDF 1200 may include a first fabric switch 1202; the first fabric switch 1202 configured to route data traffic requiring a specific first security level; for example, a top secret clearance. Any user attempting to access data on the first fabric switch 1202 would have to possess the corresponding security level.

The SDF 1200 may include a second fabric switch 1204; the second fabric switch 1204 configured to route data traffic requiring a second specific security level, different front the first specific security level; for example, a secret clearance. Any user attempting to access data on the second fabric switch 1204 would have to possess the corresponding security level.

The SDF 1200 may also include one or more MLS processing elements 1208. A MLS processing element 1208 may be connected to both the first fabric switch 1202 and the second fabric switch 1204. The MLS processing element 1208 may function as an authenticating mechanism between the first fabric switch 1202 and the second fabric switch 1204. Each MLS processing element 1208 may also be connected to a dedicated network servicing data traffic of a particular security level. For example, each MLS processing element 1208 may be connected to a first network 1210 and to a second network 1212. Each MLS processing element 1208 may therefore provide a data access site crossing security levels. A user having access to the first network 1210, or to the second network 1212, may attempt to access data or a process connected to the either the first fabric switch 1202 or the second fabric switch 1204.

A user having access to a MLS processing element 1208 may access both the first network 1210 and the second network 1212, but the user would still require appropriate security levels for each. Likewise, a user with appropriate security levels may access both the first fabric switch 1202 and the second fabric switch 1204 through either network 1210, 1212 because the MLS processing element 1208 establishes a path for such access.

The SDF 1200 may include a third fabric switch 1206; the third fabric switch 1206 configured to route data traffic requiring a third specific security level, different front the first specific security level and the second specific security level; for example, an unclassified clearance. Any user attempting to access data on the third fabric switch 1206 would have to possess the corresponding security level. Furthermore, each MLS processing element 1208 may function as an authenticating mechanism between the first fabric switch 1202, the second fabric switch 1204 and the third fabric switch 1206. A user having access to the MLS processing element 1208 may access the first fabric switch 1202, the second fabric switch 1204 and the third fabric switch 1206, but the user would still require appropriate security levels. The MLS processing element 1208 may be part of a trusted processing device specially adapted for authentication and data transfer between security level levels. Each MLS processing element 1208 may further be connected to a third network 1214 having security level different from the first network 1210 and the second network 1212.

Each of the first fabric switch 1202, second fabric switch 1204 and third fabric switch 1206 may be implemented as a single PCIe switch. PCIe protocol includes characteristics for deterministic communication, such as: well bounded worst case time for set size data transfer; well defined jitter in communication time for all data transfer; cross check for data arrival; and cross check for data integrity. One skilled in the art may appreciate that technologies other than PCIe may be used to implement the present invention if such technologies provide equivalent characteristics for deterministic communication.

Figure 13:
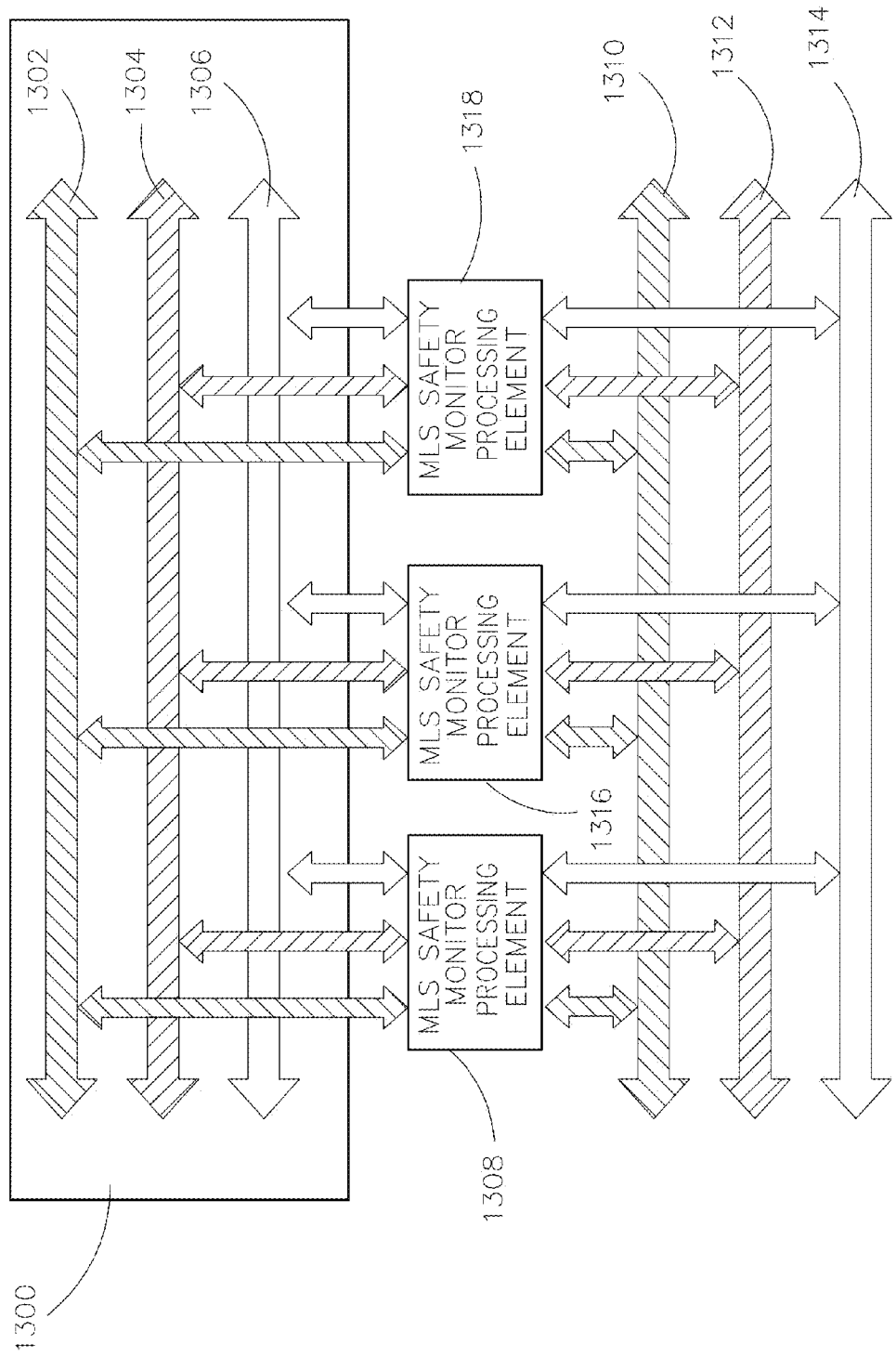
FIG. 13 shows a block diagram of a system having a secure deterministic fabric with several multi-level security elements for providing connections between the secure deterministic fabric and several segregated networks.

Referring to FIG. 13, a block diagram of a system having a secure deterministic fabric with several multi-level security elements for providing connections between the secure deterministic fabric and several segregated networks is shown. The SDF 1300 may include a first fabric switch 1302; the first fabric switch 1302 configured to route data traffic requiring a specific first security level and/or security level; for example, a top secret clearance or Level A critical flight data. Any user attempting to access data on the first fabric switch 1302 would have to possess the corresponding security level.

The SDF 1300 may include a second fabric switch 1304; the second fabric switch 1304 configured to route data traffic requiring a second specific security level and/or safety level, different front the first specific security level or safety level; for example, a secret clearance or Level B flight data. Any user attempting to access data on the second fabric switch 304 would have to possess the corresponding security level.

The SDF 1300 may also include one or more MLS safety monitor processing elements 1308, 1316, 1318. A MLS safety monitor processing element 1308, 1316, 1318 may be connected to both the first fabric switch 1302 and the second fabric switch 1304. The MLS safety monitor processing element 1308, 1316, 1318 may function as an authenticating mechanism between the first fabric switch 1302 and the second fabric switch 1304. Each MLS safety monitor processing element 1308, 1316, 1318 may also be connected to a dedicated network servicing data traffic of a particular security level. For example, a first MLS safety monitor processing element 1308 may be connected to a first network 1310, and a second MLS safety monitor processing element 1316 may be connected to a second network 1312. Each MLS safety monitor processing element 1308, 1316, 1318 may therefore provide separate processing channels with redundant monitoring and multiple data access sites crossing security levels and safety levels.

A user having access to the first fabric switch 1302 through a first network 1310, or through some device connected to the first network 1310, may attempt to access data or a process connected to the second fabric switch 1304. The MLS safety monitor processing element 1308 may also perform cross checks as further set forth herein.

The SDF 1300 may include a third fabric switch 1306; the third fabric switch 1306 configured to route data traffic requiring a third specific security level and/or safety level, different front the first specific security level or safety level and the second specific security level or safety level; for example, an unclassified clearance or Level E flight data. Any user attempting to access data on the third fabric switch 1306 would have to possess the corresponding security level. The one or more MLS safety monitor processing elements 1308 may function as authenticating mechanisms between the first fabric switch 1302, the second fabric switch 1304 and the third fabric switch 1306. A user having access to the MLS safety monitor processing element 1308 may access the first fabric switch 1302, the second fabric switch 1304 and the third fabric switch 1306, but the user would still require appropriate security levels. A third MLS processing element 1318 may further be connected to a third network 1314 having security level different from the first network 1310 and the second network 1312.

The MLS safety monitor processing elements 1308, 1316, 1318 may also perform cross checks on data sent from one or more networks 1310, 1312, 1314. A single MLS safety monitor processing element 1308 may operate on data and networks 1310, 1312, 1314 connected to a single fabric switch 1302, 1304, 1306 or across multiple fabric switches 1302, 1304, 1306.

Each of the first fabric switch 1302, second fabric switch 1304 and third fabric switch 1306 may be implemented as a single PCIe switch. PCIe protocol includes characteristics for deterministic communication, such as: well bounded worst case time for set size data transfer; well defined jitter in communication time for all data transfer; cross check for data arrival; and cross check for data integrity. One skilled in the art may appreciate that technologies other than PCIe may be used to implement the present invention if such technologies provide equivalent characteristics for deterministic communication.

Figure 14:
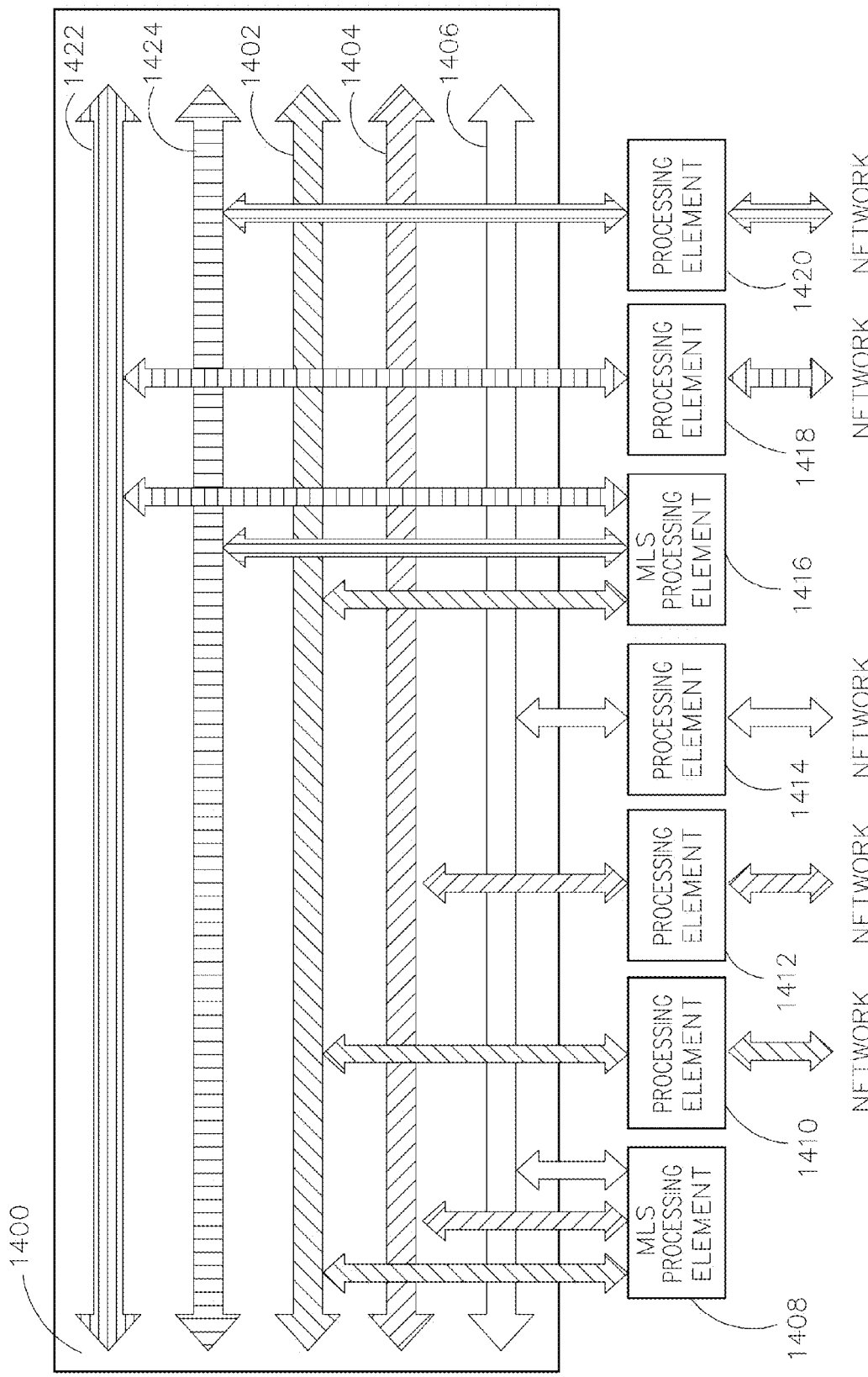
FIG. 14 shows a block diagram of a system having a secure deterministic fabric for providing secure data communication in an environment having five levels of security.

Referring to FIG. 14, a block diagram of a system having a secure deterministic fabric for providing secure data communication in an environment having five levels of security is shown. The SDF 1400 may include a first fabric switch 1402; the first fabric switch 1402 configured to route data traffic requiring a specific first security level. Dedicated processing elements 1410 connected to the first fabric switch 1402 may only communicate with the first fabric switch 1402 and other processing elements connected to the first fabric switch 1402. Any user attempting to access data on the first fabric switch 1402 would have to possess the corresponding security level.

The SDF 1400 may also include two or more MLS processing elements 1408, 1416. Each MLS processing element 1408 may be connected to the first fabric switch 1402.

The SDF 1400 may include one or more first MLS fabric switches 1404, 1406; each of the first MLS fabric switches 1404, 1406 configured to route data traffic requiring a specific security level. Dedicated processing elements 1412, 1414 connected to the first MLS fabric switches 1404, 1406 may only communicate with their respective first MLS fabric switches 1404, 1406 and other processing elements connected to such first MLS fabric switch 1404, 1406.

A first MLS processing element 1408 may function as an authenticating mechanism between the first fabric switch 1402 and the first MLS fabric switches 1404, 1406. A user having access to the first fabric switch 1402 through a dedicated processing element 1410, or through some device connected to a network connected to the dedicated processing element 1410, may attempt to access data or a process connected to the first MLS fabric switches 1404, 1406.

The SDF 1400 may include one or more second MLS fabric switches 1422, 1424; each of the second MLS fabric switches 1422, 1424 configured to route data traffic requiring a specific security level. Dedicated processing elements 1418, 1420 connected to the second MLS fabric switches 1422, 1424 may only communicate with their respective second MLS fabric switches 1422, 1424 and other processing elements connected to such second MLS fabric switch 1422, 1424.

A second MLS processing element 1416 may function as an authenticating mechanism between the first fabric switch 1402 and the second MLS fabric switches 1422, 1424. A user having access to the first fabric switch 1402 through a dedicated processing element 1410, or through some device connected to a network connected to the dedicated processing element 1410, may attempt to access data or a process connected to the second MLS fabric switches 1422, 1424.

Because the first MLS processing element 1408 and the second MLS processing element 1416 are each connected to the first fabric switch 1402, the first MLS processing element 1408 and the second MLS processing element 1416 may function together as an authenticating mechanism between the first MLS fabric switches 1404, 1406 and the second MLS fabric switches 1422, 1424 via the first fabric switch 1402.

Each fabric switch 1402, 1404, 1406, 1422, 1424 may be implemented as a single PCIe switch. PCIe protocol includes characteristics for deterministic communication, such as: well bounded worst case time for set size data transfer; well defined jitter in communication time for all data transfer; cross check for data arrival; and cross check for data integrity. One skilled in the art may appreciate that technologies other than PCIe may be used to implement the present invention if such technologies provide equivalent characteristics for deterministic communication.

Figure 15:
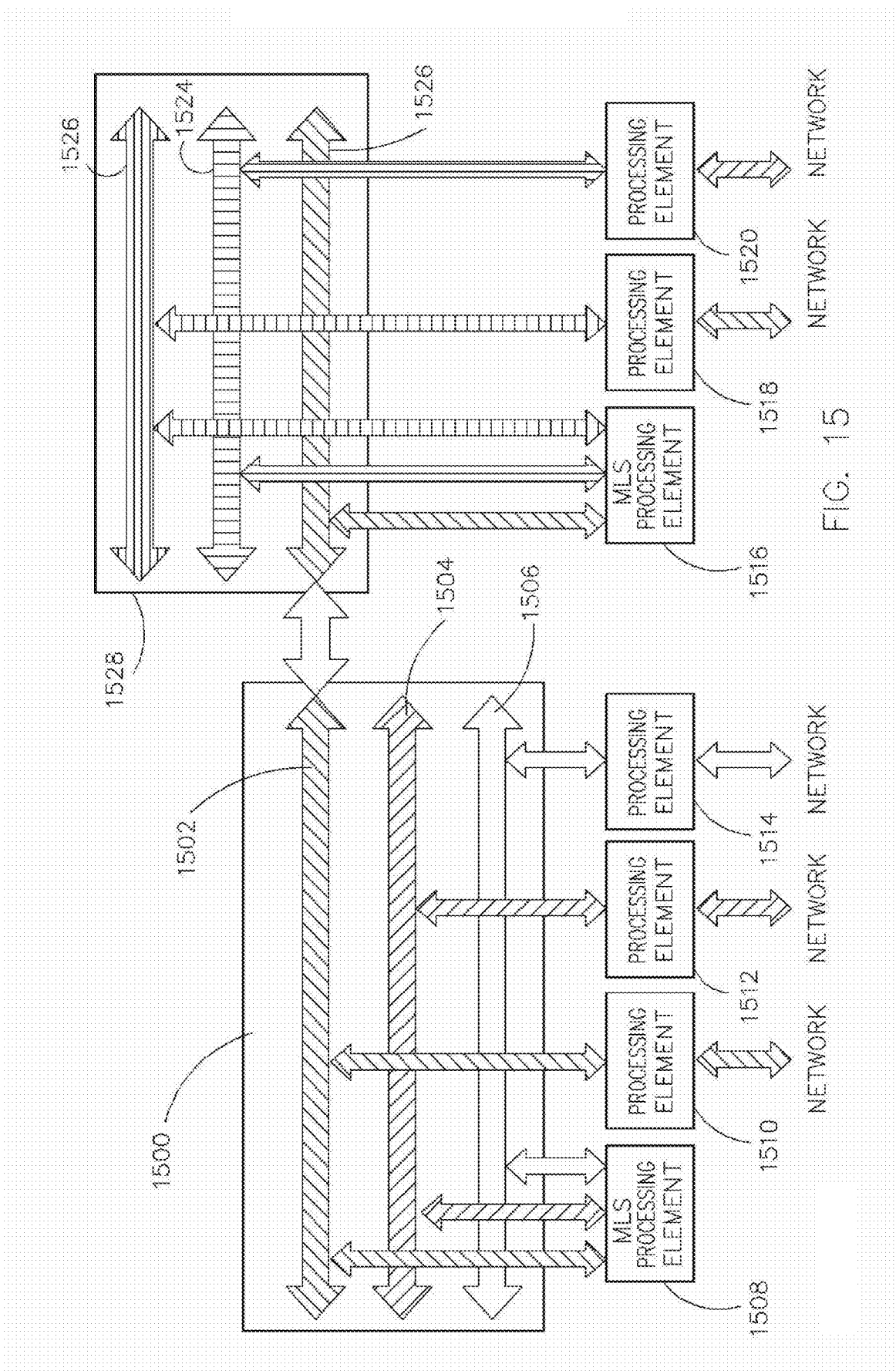
FIG. 15 shows a block diagram of a system having two secure deterministic fabrics, interconnected by a bridge, for providing secure data communication.

Referring to FIG. 15, a block diagram of a system having two secure deterministic fabrics, interconnected by a bridge, for providing secure data communication is shown. A first SDF 1500 may include one or more first SDF fabric switches 1502, 1504, 1506; each of the first SDF fabric switches 1502, 1504, 1506 configured to route data traffic requiring a specific security level. Dedicated processing elements 1510, 1512, 1514 connected to the first SDF fabric switches 1502, 1504, 1506 may only communicate with other processing elements connected to each of the first SDF fabric switches 1502, 1504, 1506 respectively. Any user attempting to access data on the first SDF fabric switches 1502, 1504, 1506 would have to possess a corresponding security level.

The first SDF 1500 may also include a first SDF MLS processing element 1508. The first SDF MLS processing element 1508 may be connected to each of the first SDF fabric switches 1502, 1504, 1506.

A second SDF 1528 may include one or more second SDF fabric switches 1522, 1524, 1526; each of the second SDF fabric switches 1522, 1524, 1526 configured to route data traffic requiring a specific security level. Dedicated processing elements 1518, 1520 connected to the second SDF fabric switches 1522, 1524, 1526 may only communicate with other processing elements connected to each of the second SDF fabric switches 1522, 1524, 1526 respectively. Any user attempting to access data on the second SDF fabric switches 1522, 1524, 1526 would have to possess a corresponding security level.

The second SDF 1528 may also include a first SDF MLS processing element 1508. The second SDF MLS processing element 1516 may be connected to each of the second SDF fabric switches 1522, 1524, 1526.

The first SDF 1500 and second SDF 1528 may be connected by an inter-SDF connection 1530. The inter-SDF connection 1530 may link a particular fabric switch 1502 from the first SDF 1500 to a particular fabric switch 1526 of the second SDF 1528 such that data may be transferred between the first SDF 1500 and the second SDF 1528. The first SDF MLS processing element 1508 and the second SDF MLS processing element 1516 may function together as an authenticating mechanism between the first SDF 1500 and the second SDF 1528.

Systems using SDF may gain size, weight, and power (SWAP) advantages, increased performance, and reduced communication latency. In addition, flexibility for growth in processing and I/O capability are provided by the SDF solutions because each component is designed for use in both a safe and secure environment.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An apparatus for routing data traffic comprising:
a first fabric switch;
a second fabric switch; and
a plurality of processing elements connected to the first fabric switch and the second fabric switch, each of the plurality of processing elements configured to authenticate security credentials associated with each of the first fabric switch and the second fabric switch,
wherein:
the first fabric switch is configured to exclusively route data having a first security level;
the second fabric switch is configured to exclusively route data having a second security level;
the first fabric switch is physically separated from the second fabric switch; and
a first processing element in the plurality of processing elements is configured to authenticate data traffic directed toward a second processing element in the plurality of processing elements when the second processing element fails.

2. The apparatus of claim 1, wherein each of the plurality of processing elements is a multi-level security processing element configured to allow data to move between the first fabric switch and the second fabric switch.

3. The apparatus of claim 2, wherein each of the plurality of processing elements is further connected to a network configured for carrying data requiring a particular security level.

4. The apparatus of claim 1, further comprising one or more encryption based separation elements, each of the one or more encryption based separation elements connected to one of the first fabric switch or the second fabric switch, wherein each encryption based separation element is configured to virtually separate data into two or more virtual channels with data encryption.

5. The apparatus of claim 4, wherein data encryption comprises a full encryption of a data payload.

6. The apparatus of claim 4, wherein data encryption comprises a full encryption of a data payload and at least a portion of a data header.

7. The apparatus of claim 4, wherein data encryption comprises at least one label cryptographically bound to at least one or a data payload or header.

8. The apparatus of claim 1, further comprising one or more I/O and data stores, each of the one or more I/O and data stores connected one of the first fabric switch or the second fabric switch.

9. The apparatus of claim 1, wherein:
each of the plurality of processing elements comprises a memory; and
each of the plurality of processing elements is configured to:
define a portion of the memory for exclusive use by data from the first fabric switch; and
define a portion of the memory for exclusive use by data from the second fabric switch.

10. An apparatus for routing data traffic comprising:
a first fabric switch;

a second fabric switch; and
a plurality of safety monitor processing elements connected to the first fabric switch and the second fabric switch, each of the plurality of safety monitor processing elements configured to authenticate security credentials associated with each of the first fabric switch and the second fabric switch,
wherein:
the safety monitor processing element is configured to perform at least one cross check of data produced by processing elements connected to at least one of the first fabric switch or the second fabric switch; and
the first fabric switch is physically separated from the second fabric switch;
a first safety monitor processing element in the plurality of safety monitor processing elements is configured to authenticate data traffic directed toward a second safety monitor processing element in the plurality of safety monitor processing elements when the second safety monitor processing element fails.

11. The apparatus of claim 10, further comprising one or more encryption based separation elements, each of the one or more encryption based separation elements connected to one of the first fabric switch or the second fabric switch, wherein each encryption based separation element is configured to virtually separate data into two or more virtual channels with data encryption.

12. The apparatus of claim 11, wherein data encryption comprises a full encryption of a data payload.

13. The apparatus of claim 11, wherein each of the plurality of safety monitor processing elements is configured to perform cross checks on data corresponding to at least two processes requiring at least two safety levels.

14. The apparatus of claim 11, wherein data encryption comprises at least one label cryptographically bound to at least one or a data payload or header.

15. The apparatus of claim 10, further comprising one or more I/O and data stores, each of the one or more I/O and data stores connected one of the first fabric switch or the second fabric switch.

16. The apparatus of claim 10, wherein the first fabric switch and the second fabric switch are produced by different manufacturers.

17. An apparatus for routing data traffic comprising:
a first fabric switch;
a second fabric switch; and
a plurality of multi-level security and multi-level safety monitor processing elements connected to the first fabric switch and the second fabric switch, each of the plurality of multi-level security and multi-level safety monitor processing elements configured to authenticate security credentials associated with each of the first fabric switch and the second fabric switch,
wherein:
the first fabric switch is configured to route data having a first security level;
the second fabric switch is configured to route data having a second security level;
the first fabric switch is physically separated from the second fabric switch;
each of the plurality of multi-level security and multi-level safety monitor processing elements is configured to allow data to move between the first fabric switch and the second fabric switch, and perform at least one cross check of data produced by processing elements connected to at least one of the first fabric switch or the second fabric switch; and
a first multi-level security and multi-level safety monitor processing element in the plurality of multi-level security and multi-level safety monitor processing elements is configured to authenticate data traffic directed toward a second multi-level security and multi-level safety monitor processing element in the plurality of multi-level security and multi-level safety monitor processing elements when the second multi-level security and multi-level safety monitor processing element fails.

18. The apparatus of claim 17, further comprising one or more encryption based separation elements, each of the one or more encryption based separation elements connected to one of the first fabric switch or the second fabric switch, wherein each encryption based separation element is configured to virtually separate data into two or more virtual channels with data encryption.

19. The apparatus of claim 17, further comprising one or more I/O and data stores, each of the one or more I/O and data stores connected one of the first fabric switch or the second fabric switch.

20. The apparatus of claim 17, wherein the first fabric switch and the second fabric switch are produced by different manufacturers.

* * * * *